US010703201B2

(12) United States Patent
Bassis

(10) Patent No.: US 10,703,201 B2
(45) Date of Patent: Jul. 7, 2020

(54) MODULAR MOTOR GEARBOX UNIT AND DRIVE SYSTEM

(71) Applicant: NIO USA, Inc., San Jose, CA (US)

(72) Inventor: Dimitri Bassis, Menlo Park, CA (US)

(73) Assignee: NIO USA, Inc., San Jose, CA (US)

(*) Notice: Subject to any disclaimer, the term of this patent is extended or adjusted under 35 U.S.C. 154(b) by 170 days.

(21) Appl. No.: 15/841,080

(22) Filed: Dec. 13, 2017

(65) Prior Publication Data

US 2019/0176618 A1    Jun. 13, 2019

(51) Int. Cl.
| | |
|---|---|
| *B60K 17/354* | (2006.01) |
| *B60K 1/02* | (2006.01) |
| *B60K 17/356* | (2006.01) |
| *B60L 50/51* | (2019.01) |
| *B60K 7/00* | (2006.01) |
| *B60K 1/00* | (2006.01) |
| *B60K 17/16* | (2006.01) |

(52) U.S. Cl.
CPC ............ *B60K 17/354* (2013.01); *B60K 1/00* (2013.01); *B60K 1/02* (2013.01); *B60K 7/0007* (2013.01); *B60K 17/356* (2013.01); *B60L 50/51* (2019.02); *B60K 17/16* (2013.01); *B60K 2001/001* (2013.01); *B60K 2007/0046* (2013.01); *B60L 2260/28* (2013.01)

(58) Field of Classification Search
None
See application file for complete search history.

(56) References Cited

U.S. PATENT DOCUMENTS

| | | | |
|---|---|---|---|
| 638,643 | A | 12/1899 | Newman et al. |
| 1,251,749 | A | 1/1918 | Cilley |
| 1,728,889 | A | 9/1929 | Kemble |
| 5,743,347 | A | 4/1998 | Gingerich |

(Continued)

FOREIGN PATENT DOCUMENTS

| | | |
|---|---|---|
| CN | 103237673 | 8/2013 |
| CN | 103786568 | 5/2014 |

(Continued)

OTHER PUBLICATIONS

Final Action for U.S. Appl. No. 15/690,069, dated Oct. 9, 2018, 11 pages.

(Continued)

*Primary Examiner* — Jacob D Knutson
*Assistant Examiner* — Harold Eric Pahlck, III
(74) *Attorney, Agent, or Firm* — Sheridan Ross P.C.

(57) ABSTRACT

A modular gearbox unit and drive system are provided. The modular gearbox unit and drive system may be part of a vehicle platform having multiple drivetrain mount areas including identical mount features disposed at each mount area. Each drivetrain mount area can receive a modular single-motor drive unit or a modular multiple-motor drive unit using the same mount or bolt pattern and features. These modular single-motor and multiple-motor drive units have a common bolt pattern and mating features that correspond to the mount features of the vehicle platform and/or vehicle frame. The modular gearbox unit and drive system allows a vehicle powertrain to be reconfigured, during or after assembly, quickly and easily using the same mount points.

20 Claims, 12 Drawing Sheets

(56) References Cited

U.S. PATENT DOCUMENTS

| | | | |
|---|---|---|---|
| 5,829,542 A | 11/1998 | Lutz | |
| 5,927,417 A | 7/1999 | Brunner et al. | |
| 6,089,341 A | 7/2000 | Gingerich | |
| 6,276,474 B1 | 8/2001 | Ruppert et al. | |
| 6,727,620 B2 | 4/2004 | White et al. | |
| 7,028,583 B2* | 4/2006 | Bennett | B60K 6/36 |
| | | | 180/65.6 |
| 7,112,155 B2 | 9/2006 | Keuth | |
| 7,276,005 B2 | 10/2007 | Morikawa | |
| 7,350,606 B2 | 4/2008 | Brill et al. | |
| 7,530,420 B2 | 5/2009 | Davis et al. | |
| 7,627,503 B1* | 12/2009 | Champagne | G06Q 10/0833 |
| | | | 705/26.5 |
| 7,854,674 B2 | 12/2010 | Freudenreich | |
| 7,935,014 B2 | 5/2011 | Bachmann | |
| 8,091,677 B2 | 1/2012 | Murty | |
| 8,561,732 B2 | 10/2013 | Schoon | |
| 8,640,800 B2 | 2/2014 | Ambruster et al. | |
| 8,640,801 B2 | 2/2014 | Hennings et al. | |
| 8,727,923 B2 | 5/2014 | Huelsemann | |
| 9,168,818 B2* | 10/2015 | Hirai | B60G 3/00 |
| 9,487,163 B2 | 11/2016 | Matano et al. | |
| 9,566,851 B2 | 2/2017 | Kawamura et al. | |
| 1,005,296 A1 | 8/2017 | Valeri et al. | |
| 9,724,990 B2* | 8/2017 | Hoermandinger | B60K 5/04 |
| 9,821,650 B2* | 11/2017 | Falls | B60K 1/02 |
| 9,845,123 B2* | 12/2017 | Byrnes | B60L 15/20 |
| 2005/0092533 A1 | 5/2005 | Ishii | |
| 2005/0211490 A1 | 9/2005 | Shimizu et al. | |
| 2006/0225930 A1 | 10/2006 | Schulte | |
| 2009/0014223 A1 | 1/2009 | Jones et al. | |
| 2010/0108417 A1 | 5/2010 | Gilmore | |
| 2011/0094807 A1 | 4/2011 | Pruitt | |
| 2011/0162899 A1 | 7/2011 | Blade | |
| 2011/0192662 A1 | 8/2011 | Hennings et al. | |
| 2011/0259657 A1 | 10/2011 | Fuechtner | |
| 2012/0052995 A1 | 3/2012 | Scrabo et al. | |
| 2012/0058853 A1 | 3/2012 | Schoon et al. | |
| 2017/0130625 A1 | 5/2017 | Jung | |
| 2018/0237076 A1* | 8/2018 | Perlo | B29C 39/10 |
| 2018/0250982 A1 | 9/2018 | Albl et al. | |
| 2018/0345777 A1* | 12/2018 | Birnschein | B60L 58/10 |

FOREIGN PATENT DOCUMENTS

| | | | |
|---|---|---|---|
| CN | 104967250 | 10/2015 | |
| CN | 205632080 U | 10/2016 | |
| WO | WO 2007/118082 | 10/2007 | |
| WO | WO-2009017533 A1 * | 2/2009 | B62D 21/04 |
| WO | WO 2017/211793 | 12/2017 | |

OTHER PUBLICATIONS

U.S. Appl. No. 15/690,069, filed Aug. 29, 2017, Bassis.

U.S. Appl. No. 15/842,362, filed Dec. 14, 2017, Bassis et al.

"Gasoline Turbocharger," BorgWarner Inc., 2016, retrieved from https://www.borgwarner.com/docs/default-source/investors/investor-events-presentations/bw_investorday_kiosks.pdf?sfvrsn=9, retrieved on Apr. 12, 2018, 40 pages.

"I-Pace Concept," Jaguar, brochure, 2016, 23 pages.

Kane, "Rimac Automobili Enters Electric Vehicle Powertrain Market With True Authority; Will Sell All of Its Highly Specialized Components," INSIDEEVs, 2013, retrieved from https://insideevs.com/rimac-automobili-to-enter-electric-vehicle-powertrain-market-with-true-authority!, retrieved on Apr. 12, 2018, 3 pages.

Official Action for U.S. Appl. No. 15/690,069, dated Apr. 2, 2018, 12 pages.

Official Action for U.S. Appl. No. 15/690,069, dated Jan. 29, 2019, 13 pages.

Notice of Allowance for U.S. Appl. No. 15/690,069, dated Jul. 29, 2019, 8 pages.

Notice of Allowance for U.S. Appl. No. 15/842,362, dated May 8, 2019, 9 pages.

* cited by examiner

MODULAR MOTOR GEARBOX UNIT AND DRIVE SYSTEM

FIELD

The present disclosure is generally directed to vehicle transmission systems, in particular, toward electric and/or hybrid-electric vehicles with electric motor drive units.

BACKGROUND

Vehicle transmissions are designed to control the application of power output from an engine. Conventional transmissions generally include a gearbox comprising one or more gears that can be selectively engaged with a power input shaft at a number of gear ratios. The crankshaft, or other rotating member or coupling, of an engine may serve as the power input shaft to the transmission. The transmission and gearbox can provide an output speed, torque, power, or other mechanical characteristic that is different from, or the same as, that provided by the power input shaft of the engine. The power output from the transmission is provided, in some form, to the drive wheel, or wheels, of a vehicle.

Most internal combustion engines rely on the transmission to provide optimal torque and vehicle speeds over a range of operating conditions. In contrast, electric vehicles, employing one or more electric motors, have a wide torque band capable of providing maximum torque output at low or high revolutions per minute (rpm). In some cases, an electric vehicle may include a gearbox configured with a planetary gear reduction. This type of gearbox may be designed to match the rpm of the electric motor to that of the drive wheels.

In any event, transmissions can be large, heavy, noisy, and generally require specific mounting interfaces that can dictate the design and/or limit the configuration of a vehicle.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
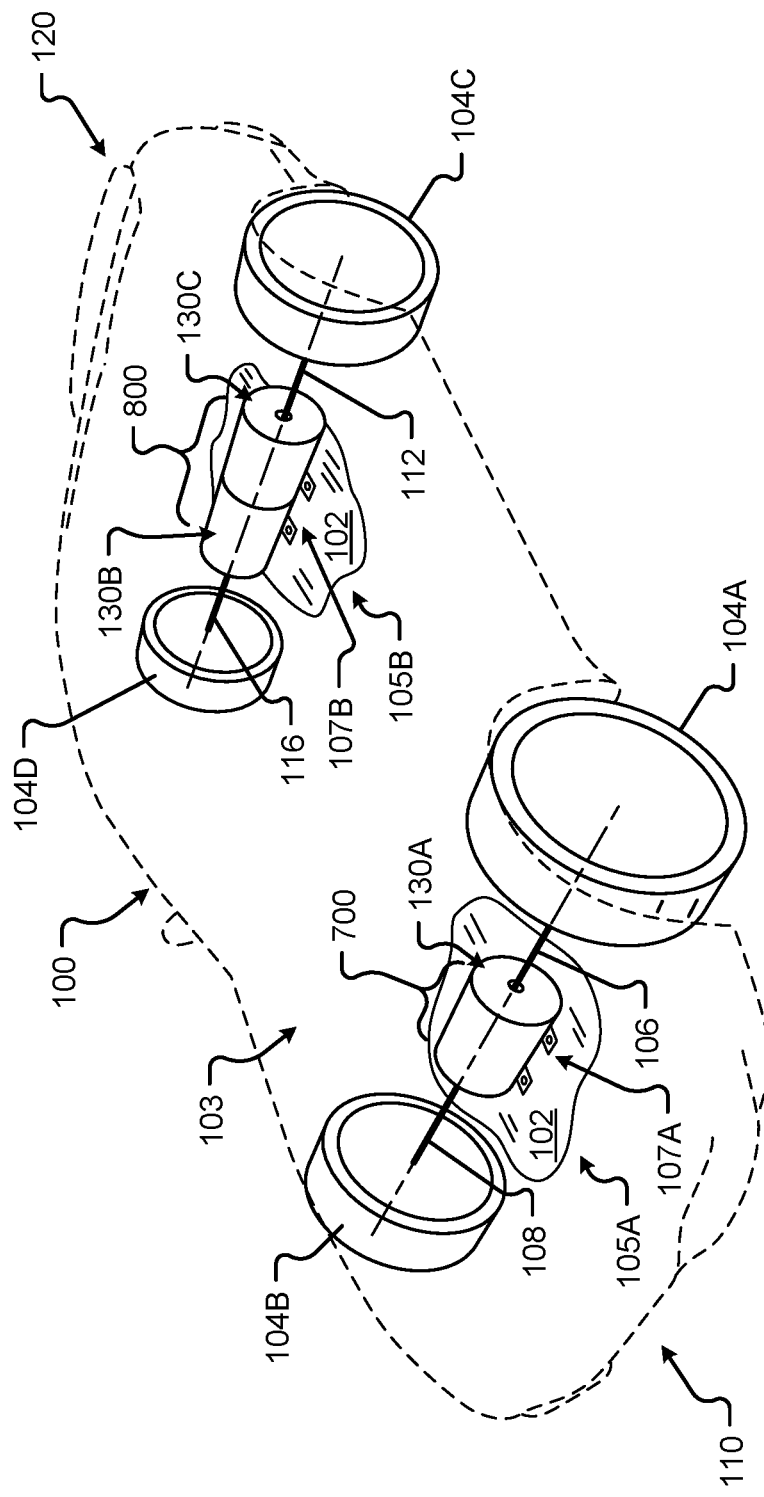
FIG. 1 shows a schematic perspective view of a vehicle powertrain in accordance with embodiments of the present disclosure.

FIG. 1 shows a perspective view of a vehicle powertrain 103 in accordance with embodiments of the present disclosure. The vehicle powertrain 103 may be part of an electric vehicle 100. The vehicle 100 may comprise a vehicle frame 102, vehicle front 110, vehicle aft, or rear, 120, vehicle roof, at least one vehicle side, a vehicle undercarriage, and a vehicle interior. In some embodiments, the frame 102 may include one or more body panels mounted or affixed thereto. The frame 102 may be a portion of the vehicle chassis, structure, support, and/or some other rigid mount member of a vehicle 100. The vehicle 100 may include one or more interior components (e.g., components inside an interior space, or user space, of a vehicle 100, etc.), exterior components (e.g., components outside of the interior space, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The powertrain 103 may include one or more motor gearbox units 130A-C. The motor gearbox units 130A-C may be configured to provide power to one or more wheels 104A-D of the vehicle 100 via at least one drive axle 106, 108, 112, 116. The motor gearbox units 130A-C may include an electric motor that is mechanically coupled with a gearbox. In some embodiments, the motor gearbox units 130A-C may include an inverter. The inverter may be configured to convert direct current (DC) electricity provided from a battery, or other DC power source, into alternating current (AC) electricity that may drive the electric motor of the motor gearbox unit 130A-C.

As shown in FIG. 1, the vehicle 100 may include at least one drivetrain 105A, 105B located in various positions in the vehicle 100. For instance, the vehicle 100 may include a front-wheel drive drivetrain 105A, a rear-wheel drive drivetrain 105B, and/or both a front and rear-wheel drive drivetrain 105A, 105B. In some embodiments, the wheels 104A-D of a vehicle 100 may be powered by one or more motor gearbox units 130A-C associated with a particular drivetrain 105A, 105B and/or drive unit 700, 800. For instance, a particular drive unit (e.g., single-motor drive unit 700 or a multiple-motor drive unit 800) may include at least one motor and gearbox unit 130A-C. In one embodiment, a single-motor drive unit 700 may provide power to more than one drive wheel 104A-B via a single motor power output shaft, and a multiple-motor drive unit 800 may provide power to more than one drive wheel 104C-D via independent power output shafts.

In the event that multiple-motor drive units 800 are employed to provide power to one or more of the drive wheels 104A-D along the same drive axis, the multiple-motor drive units 800 may share a common, or unified, housing or bulkhead and an interconnection to the vehicle frame 102. This unified housing configuration is schematically illustrated in the second and third motor gearbox units 130C, 13013 making up the multiple-motor drive unit 800 driving third and fourth drive wheels 104C, 104D, via drive axles 112, 116, respectively.

In some embodiments, the drive units 700, 800 may be mounted to a portion of the vehicle 100 via one or more attachment points, or drive unit mounts 107A, 107B. For instance, the drive units 700, 800 may be interconnected with the vehicle chassis or frame 102 via a bolted connection, clamped connection, or other attachment means. In one embodiment, the housing of the drive units 700, 800 may include one or more drive unit mount features configured to provide a removable connection to the frame 102 of the vehicle 100. These drive unit mount features can include, but are in no way limited to, one or more flanges, ledges, feet, pads, protrusions, bolt holes, apertures, studs, threaded holes, threaded rods, etc., and/or combinations thereof. In any event, the interconnection of the drive units 700, 800 with the vehicle frame 102 can allow power to be efficiently transmitted from the motor through the gearbox of each drive unit 700, 800 and respective drive axles 108, 110, 112, 116 to one or more wheels 104A-D.

The frame 102 may comprise a separate frame and body construction (i.e., body-on-frame construction), a unitary frame and body construction (i.e., a unibody construction), or any other construction defining the structure of the vehicle 100. The frame 102 may be made from one or more materials including, but in no way limited to steel, titanium, aluminum, carbon fiber, plastic, polymers, etc., and/or combinations thereof. In some embodiments, the frame 102 may be formed, welded, fused, fastened, pressed, etc., combinations thereof, or otherwise shaped to define a physical structure and strength of the vehicle 100. In any event, the frame 102 may comprise one or more surfaces, connections, protrusions, cavities, mounting points, pads, tabs, slots, or other features that are configured to receive other components that make up the vehicle 100. For example, the body panels, powertrain 103, controls system, interior components, and/or safety elements may interconnect with, or attach to, the frame 102 of the vehicle 100.

In some embodiments, the frame 102 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources, motors, drive units 700, 800, safety equipment, controllers, user interfaces, interior and/or exterior components, body panels, bumpers, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 102 may include slides, receptacles, cavities, protrusions, and/or a number of other features that allow for quick exchange of system components. In one embodiment, the frame 102 may include tray or ledge features, mechanical interconnection features, locking mechanisms, retaining mechanisms, etc., and/or combinations thereof.

In one embodiment, the vehicle frame 102 may include a first end portion disposed at the front 110 of the vehicle 100 and a second end portion disposed at the rear 120 of the vehicle 100 (e.g., opposite the first end portion). The vehicle frame 102 may include a first modular drive unit mount set 107A including first mount features spaced apart from one another in a first mount pattern having a first size and shape, the first modular drive unit mount set disposed adjacent to the first end portion of the vehicle frame 102. Additionally or alternatively, the vehicle frame 102 may include a second modular drive unit mount set 107B including second mount features spaced apart from one another in a second mount pattern having the first size and shape, such that the first mount pattern and first mount features match the second mount pattern and second mount features, the second modular drive unit mount set 107B may be disposed adjacent to the second end portion of the vehicle frame 102. In some embodiments, the first mount features and the second mount features are both configured to interchangeably engage with and retain a single-motor drive unit 700 and/or a multiple-motor drive unit 800 via drive unit mount features of the single-motor drive unit 700 and drive unit mount features of the multiple-motor drive unit 800, both drive unit mount features having a drive unit mount pattern having the first size and shape and matching the first mount pattern of the vehicle frame 102.

Figure 2:
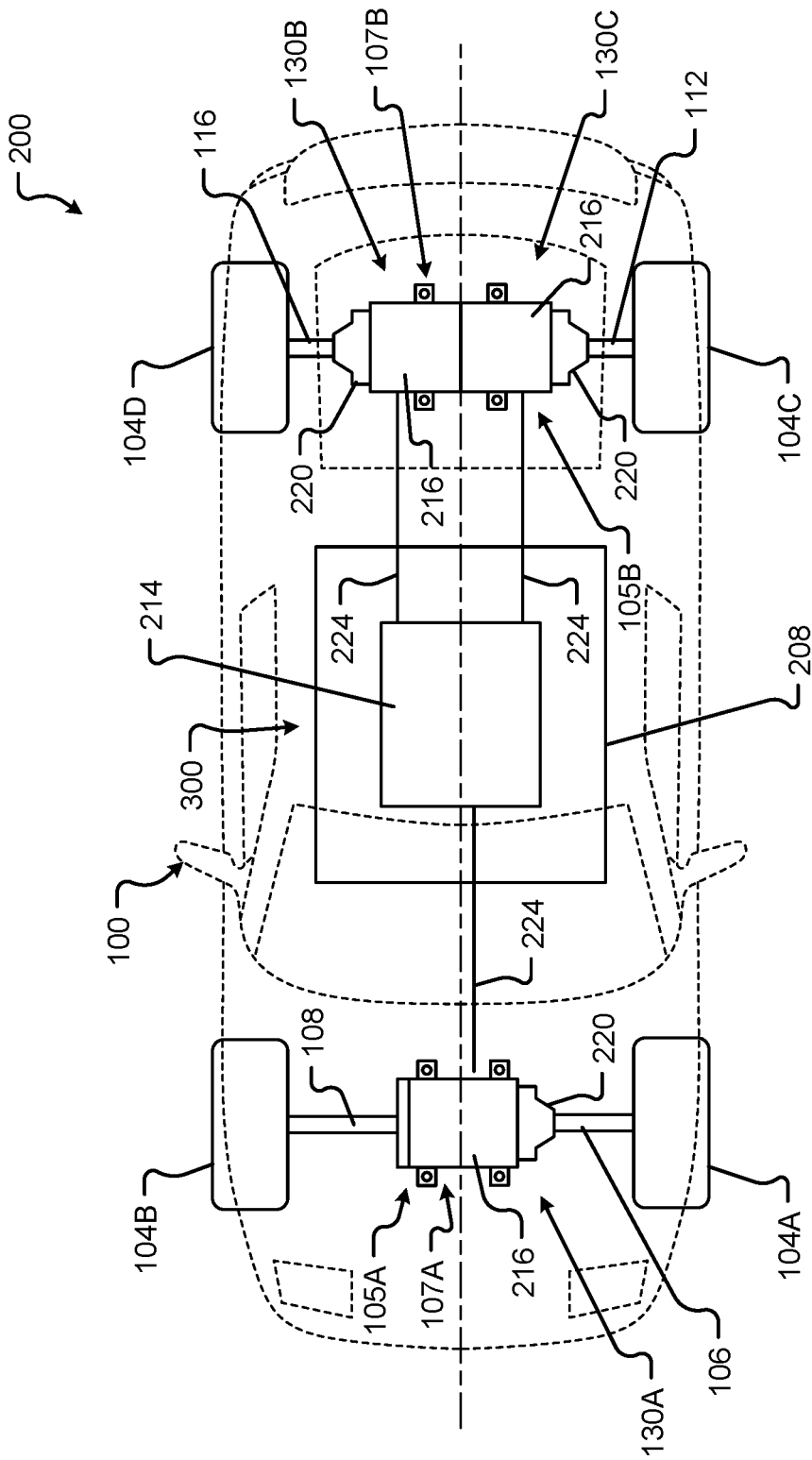
FIG. 2 shows a plan view of the vehicle powertrain in accordance with at least some embodiments of the present disclosure.

Referring now to FIG. 2, a plan view of the vehicle power system 200 will be described in accordance with embodiments of the present disclosure. The power system of the vehicle 100 may include the powertrain 103, power distribution system, accessory power system, and/or any other components that store power, provide power, convert power, and/or distribute power to one or more portions of the vehicle 100. The powertrain 103 may include the one or more electric motors 216 of the vehicle 100. The electric motors 216 are configured to convert electrical energy provided by a power source 208 into mechanical energy. This mechanical energy may be in the form of a rotational or other output force that is configured to propel or otherwise provide a motive force for the vehicle 100 via at least one drive axle 106, 108, 112, 116 interconnected to at least one drive wheel 104A-D.

In some embodiments, the vehicle 100 may include one or more drive wheels 104A-D that are driven by the one or more electric motors 216 via a gearbox 220 and drive axle 106, 108, 112, 116. The electric motors 216 and gearboxes 220 shown in FIG. 2 may correspond to the motors gearbox units 130A-C associated with drive units 700, 800, as described herein. In some embodiments, the electric motors 216 may include one or more of a motor controller, inverter, and/or an electrical interconnection to the power source 208. As provided above, the vehicle 100 may include an electric motor 216 configured to provide a driving force for each drive wheel 104A-D. In other cases, a single electric motor 216 may be configured to share an output force between two or more drive wheels 104A-D via one or more power transmission components, drive shafts, differentials, etc. It is an aspect of the present disclosure that the powertrain 103 may include one or more power transmission components, motor controllers, and/or power controllers 214 that can provide a controlled output of power to one or more of the drive wheels 104A-D of the vehicle 100. The power transmission components, power controllers 214, or motor controllers may be controlled by at least one other vehicle controller or computer system as described herein. In one embodiment, the power controller 214 may be part of the battery system or power source 208. In some embodiments, the power controller 214 may be separate from, but electrically interconnected with, the power source 208. In some embodiments, the power controller 214 may be part of the inverter.

As provided above, the powertrain 103 of the vehicle 100 may include one or more power source 208. The power source 208 may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208 may provide power to various systems of the vehicle 100. For instance, a drive power source may be configured to provide the power for the one or more electric motors 216 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208 in this manner may provide a number of benefits over conventional vehicle systems. For example, separating the power sources 208 can allow one of the power sources 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208 is depleted, removed, or becomes otherwise inoperable.

In some embodiments, the drive power source may be separated into two or more batteries, modules, cells, units, sources, and/or systems. By way of example, a vehicle 100 may include a first drive power source and a second drive power source. The first drive power source may be operated independently from or in conjunction with the second drive power source, and vice versa. Continuing this example, the first drive power source may be removed from a vehicle 100 while a second drive power source can be maintained in the vehicle 100 to provide drive power. This approach allows the vehicle 100 to significantly reduce weight (e.g., of the first drive power source, etc.) and improve power consumption, even if only for a temporary period of time.

The powertrain 103 includes one or more power distribution systems configured to transmit power from the power source 208 to one or more electric motors 216 in the vehicle 100. The power distribution system may include electrical interconnections 224 in the form of cables, wires, traces, wireless power transmission systems, contactors, relays, fuses, etc., and/or combinations thereof. It is an aspect of the present disclosure that the vehicle 100 include one or more redundant electrical interconnections to the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection is being used and/or damage has occurred to a particular area of the vehicle electrical system. In any event, the one or more redundant electrical interconnections may be configured along completely different routes than the electrical interconnections 224 shown and/or include different modes of failure than the electrical interconnections 224 to, among other things, prevent a total interruption power distribution in the event of a failure.

Figure 3:
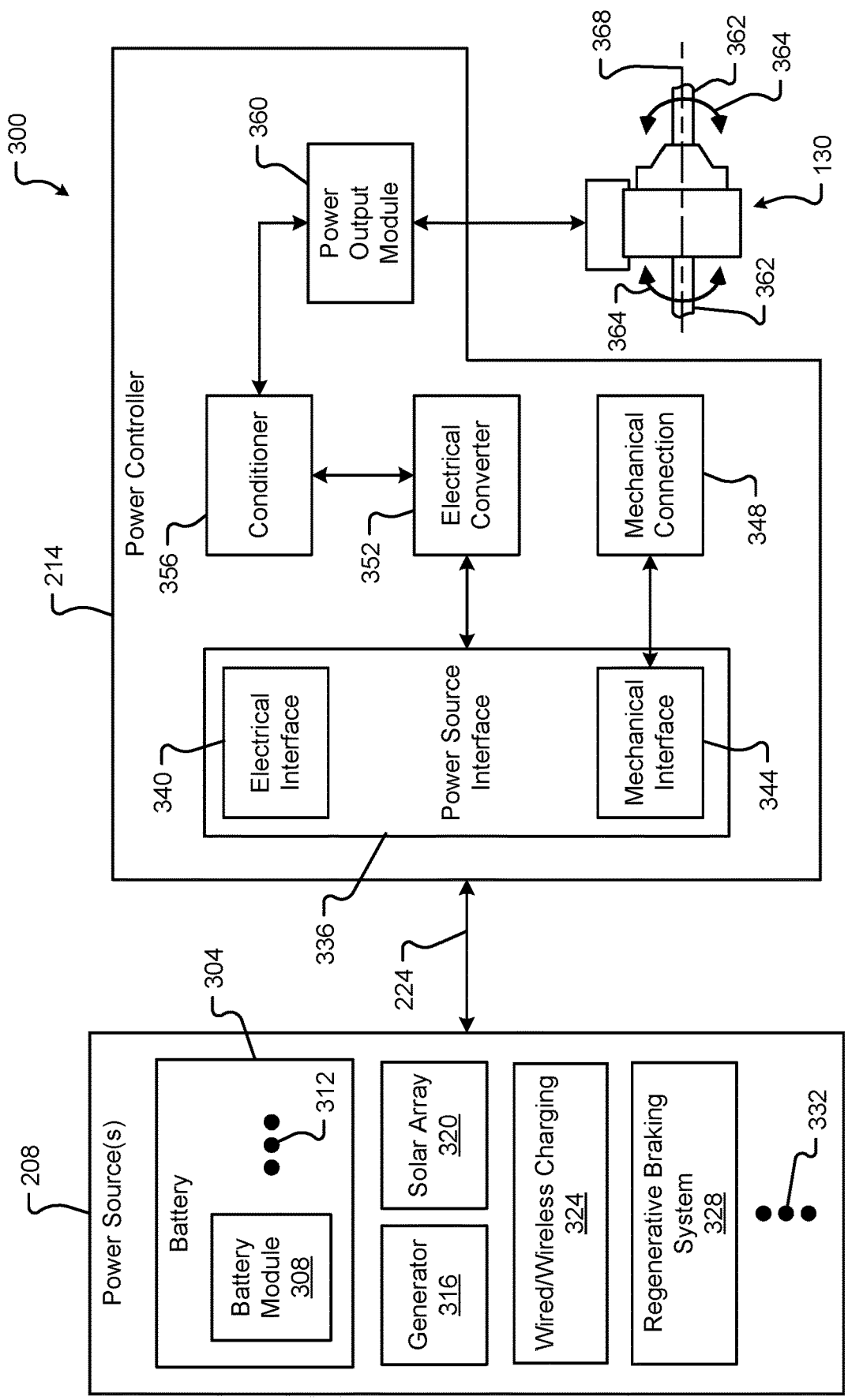
FIG. 3 is a block diagram of a power control system of the vehicle in accordance with embodiments of the present disclosure.

FIG. 3 shows a block diagram of a power control system 300 of the vehicle 100 in accordance with embodiments of the present disclosure. In particular, the power control system 300 may include a vehicle power source 208 electrically interconnected with the power controller 214. The vehicle 100 may include at least one power source 208 that generates and/or stores power, and/or load(s) (e.g., inverters, motors 216, motor gearbox units 130A-C, devices, systems, subsystems, etc.) that consume power. The power output from the power source 208 may be managed by a power controller 214. Further, the power control system 300 can include one or more other interfaces or controllers other than those shown in FIG. 3.

The power controller 214 can be a computer or computing system(s) and/or electrical system with associated components, as described herein, capable of managing the power output module 360 to receive power, routing the power to and/or from the power source 208, and then providing the power from the power source 208 to at least one load (e.g., motor 216, inverter, motor gearbox unit 130, etc.). Thus, the power controller 214 may execute programming that controls switches, devices, components, etc. involved in the reception, storage, and provision of the power in the power control system 300.

The power sources 208 can include power sources internal and/or associated with the vehicle 100 and/or power sources external to the vehicle 100 to which the vehicle 100 electrically connects. In one embodiment, the power source 208 may include a battery 304. The battery 304 may include one or more battery modules 308, battery management systems, and/or other components 312. The battery 304 may be any type of battery for storing electrical energy, for example, a lithium ion battery, a lead acid battery, a nickel cadmium battery, etc. Further, the battery 304 may include different types of power storage systems, such as, ionic fluids or other types of fuel cell systems. The battery 304 may also include one or more high-capacity capacitors. The capacitors may be used for long-term or short-term storage of electrical energy. The input into the battery 304 or capacitor may be different from the output, and thus, the capacitor may be charged quickly but drain slowly. The functioning of the converter 352 and battery 304 capacitor may be monitored or managed by a charge management unit.

One of the internal power sources can include an on board generator 316. The generator 316 may be an AC generator, a direct current DC generator, or a self-excited generator. The AC generators can include induction generators, linear electric generators, and/or other types of generators. The DC generators can include homopolar generators and/or other types of generators. The generator 316 can be brushless or include brush contacts and generate the electric field with permanent magnets or through induction. The generator 316 may be mechanically coupled to a source of kinetic energy, such as an axle 106, 108, 112, 116 or some other power take-off. The generator 316 may also have another mechanical coupling to an exterior source of kinetic energy, for example, a wind turbine.

In some embodiments, a source of power internal to or associated with the vehicle 100, may be a solar array 320. The solar array 320 may include any system or device of one or more solar cells, or photovoltaics, mounted on the exterior of the vehicle 100 or integrated within the body panels of the vehicle 100 that provides or converts solar energy into electrical energy to provide power to the battery 304 and/or one or more battery modules 308.

Another power source 208 may include wired or wireless charging 324. The wireless charging system 324 may include inductive and/or resonant frequency inductive charging systems that can include coils, frequency generators, controllers, etc. The wireless charging system 324 may include capacitive charging systems that can include capacitors, frequency generators, controllers, etc. Wired charging may be any kind of grid-connected charging that has a physical connection, although, the wireless charging may be grid connected through a wireless interface. The wired charging system 324 can include connectors, wired interconnections, the controllers, etc. The wired and wireless charging systems 324 can provide power to the battery 304 and/or one or more battery modules 308 from external power sources.

Internal sources for power may include a regenerative braking system 328. The regenerative braking system 328 can convert the kinetic energy of the moving vehicle into electrical energy through a generation system mounted within the wheels, axle, and/or braking system of the vehicle 100. The regenerative braking system 328 can include any coils, magnets, electrical interconnections, converters, controllers, etc. required to convert the kinetic energy into electrical energy.

The power source 208 may be connected to the power controller 214 through an electrical interconnection 224. The electrical interconnection 224 can include any wire, interface, bus, etc. between the one or more power sources 208 and the power controller 214.

The power controller 214 can also include a power source interface 336. The power source interface 336 can be any type of physical and/or electrical interface used to receive the electrical energy from the one or more power sources 208; thus, the power source interface 336 can include an electrical interface 340 that receives the electrical energy and a mechanical interface 344, which may include wires, connectors, or other types of devices or physical connections. The mechanical interface 344 can also include a physical/electrical connection 224 to the power controller 214.

The electrical energy from the power source 208 can be processed through the power source interface 336 to an electric converter 352. The electric converter 352 may convert the characteristics of the power from one of the power sources 208 into a useable form that may be used either by the battery 304 or one or more loads associated with the vehicle 100. The electrical converter 352 may include any electronics or electrical devices and/or component that can change electrical characteristics, e.g., AC frequency, amplitude, phase, etc. associated with the electrical energy provided by the power source 208. The converted electrical energy may then be provided to an optional conditioner 356. The conditioner 356 may include any electronics or electrical devices and/or component that may further condition the converted electrical energy by removing harmonics, noise, etc. from the electrical energy to provide a more stable and effective form of power to the vehicle 100.

In some embodiments, the power controller 214 may include one or more processors, controllers, and/or power output modules 360 configured to control and manage power output from the power source 208 to one or more motors or other loads of the vehicle 100. The power output module 360 may include one or more processor, a memory, switch, and/or electrical interconnection. In one embodiment, the power output module 360 may be configured to receive electrical energy provided by the power source 208 and control an output of the energy to the motors 216 and/or inverters described herein. In some cases, the power output module 360 may include one or more motor controllers.

As shown in FIG. 3, the loads of the vehicle 100 may include at least one motor gearbox unit 130 and/or drive unit 700, 800. The motor gearbox unit 130 and/or drive unit 700, 800 may include an inverter, an electric motor 216, and a gearbox 220. The gearbox 220 may include at least one power output shaft configured to provide rotational movement 364 in a direction about an output shaft axis 368. In some embodiments, the electric motor 216 can be any type of DC or AC electric motor. In some embodiments, for example, where the motor 216 is a DC motor, the motor gearbox unit 130 and/or the drive unit 700, 800 may not require an inverter. The motor 216 may be an induction motor (asynchronous motor), a motor with permanent magnets (synchronous motor), a reluctance motor, a universal motor, a linear motor, and/or any combination thereof having windings either on the stator, or rotor, or both the stator and rotor. The motor 216 may also be wireless or include brush contacts. In any event, the motor 216 may be capable of providing a torque and enough kinetic energy to move the vehicle 100.

Figure 4:
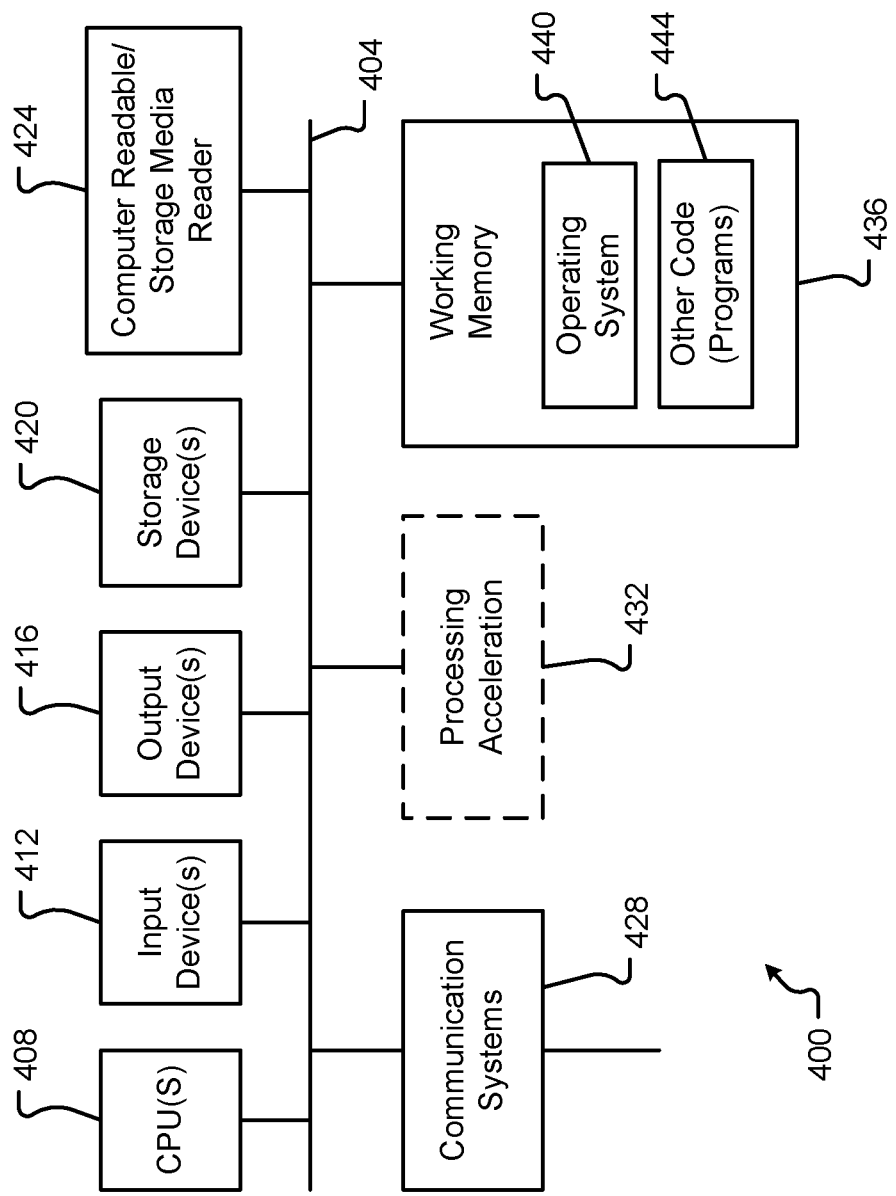
FIG. 4 is a block diagram of a computing device in accordance with embodiments of the present disclosure.

FIG. 4 illustrates one embodiment of a computer system 400 upon which the processors, computers, computing devices, or other systems or components (e.g., power output module 360, etc.) described herein may be deployed or executed. The computer system 400 is shown comprising hardware elements that may be electrically coupled via a bus 404. The hardware elements may include one or more central processing units (CPUs) 408; one or more input devices 412 (e.g., a mouse, a keyboard, a sensor, a logic device, etc.); and one or more output devices 416 (e.g., a display device, a printer, a solenoid, a relay, etc.). The computer system 400 may also include one or more storage devices 420. By way of example, storage device(s) 420 may be disk drives, optical storage devices, solid-state storage devices such as a random access memory ("RAM") and/or a read-only memory ("ROM"), which can be programmable, flash-updateable and/or the like. In some embodiments, the computer system 400 may be associated with a vehicle assembly system, vehicle manufacturing station, and/or other vehicle component integration/assembly machine.

The computer system 400 may additionally include a computer-readable storage media reader 424; a communications system 428 (e.g., a modem, a network card (wireless or wired), an infra-red communication device, etc.); and working memory 436, which may include RAM and ROM devices as described above. The computer system 400 may also include a processing acceleration unit 432, which can include a DSP, a special-purpose processor, and/or the like.

The computer-readable storage media reader 424 can further be connected to a computer-readable storage medium, together (and, optionally, in combination with storage device(s) 420) comprehensively representing remote, local, fixed, and/or removable storage devices plus storage media for temporarily and/or more permanently containing computer-readable information. The communications system 428 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine readable mediums for storing information.

The computer system 400 may also comprise software elements, shown as being currently located within a working memory 436, including an operating system 440 and/or other code 444. It should be appreciated that alternate embodiments of a computer system 400 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 408 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™ processors, ARM® Cortex-A and ARM926EJ-S™ processors, Infineon TriCore™ processors, other industry-equivalent processors, and may perform computational functions using any known or future-developed standard, instruction set, libraries, and/or architecture.

Figure 5:
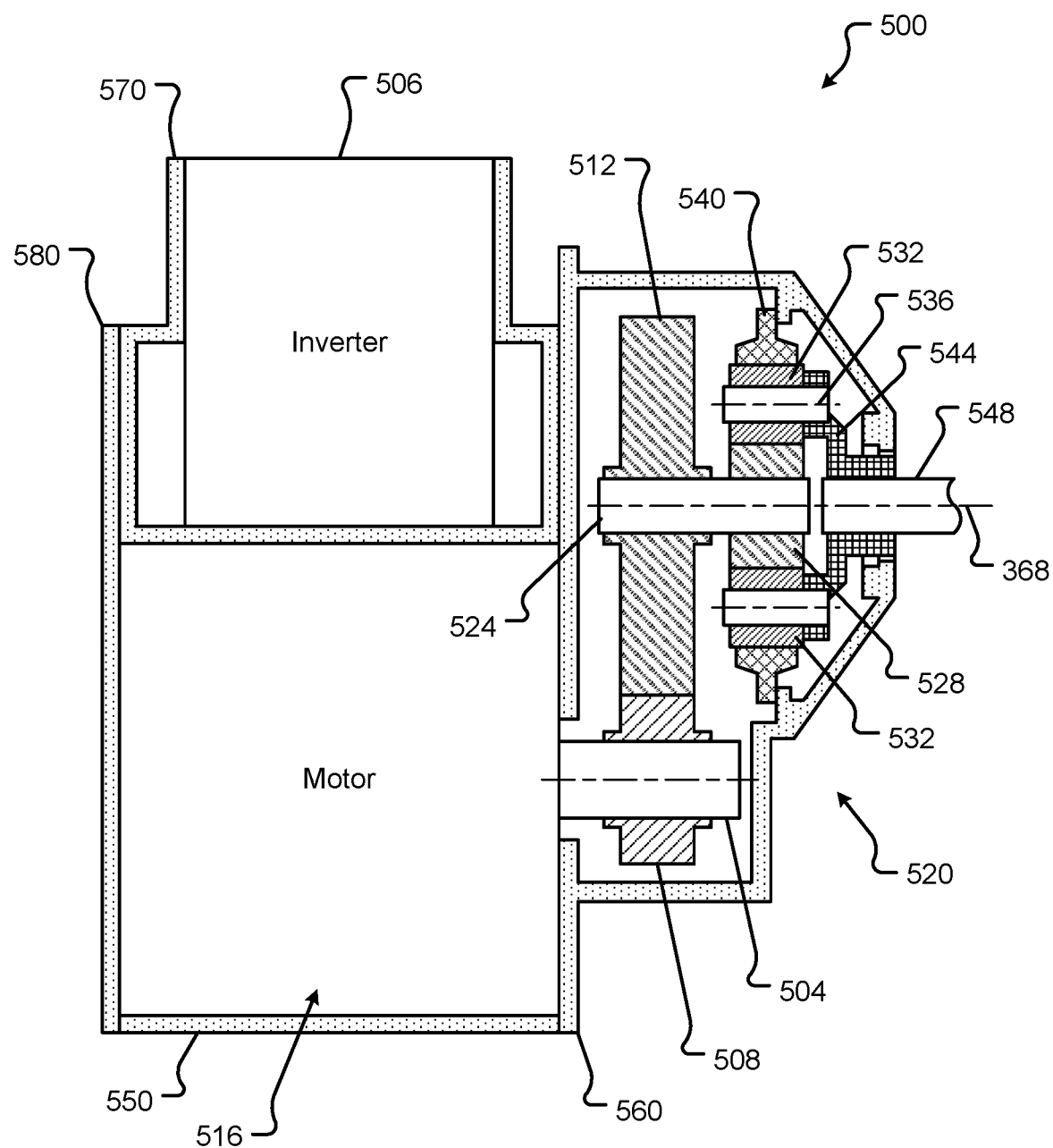
FIG. 5 shows a section view of a motor gearbox unit in accordance with embodiments of the present disclosure.

FIG. 5 shows a section view of a motor gearbox unit 500 in accordance with embodiments of the present disclosure. The motor gearbox unit 500 of FIG. 5 may be similar, if not identical, to the motor gearbox units 130, 130A-C and/or the drive units 700, 800 as described at least in conjunction with FIGS. 1-3, 7, and 8. The motor gearbox unit 500 may include an electric motor 516 mechanically interconnected to a gearbox 520 via a motor drive shaft 504. As can be appreciated, the motor 516 may be similar, if not identical, to the motor 216 described in conjunction with FIGS. 1-3. In some embodiments, the motor gearbox unit 500 may include an inverter 506 that receives DC power and outputs AC power to the motor 516. The inverter 506 may serve to regulate the power fed to the motor 516.

The motor gearbox unit 500 may include a motor 516 having a motor drive shaft 504 that is offset from a gearbox power output shaft 548. For instance, the motor 516 and the motor drive shaft 504 may be arranged close to, or in contact with, a base 550 of the motor gearbox unit 500, while the gearbox 520 may be arranged further apart, or offset, from the base 550 of the motor gearbox unit 500. Among other things, this arrangement may provide a lower center of gravity for the motor gearbox unit 500 (the motor comprising the greatest mass of the unit 500) and thus provide increased stability for a vehicle 100 (as the base 550 of the motor gearbox unit 500 may be maintained in contact with a portion of the frame 102 of the vehicle 100). In some embodiments, the power output shaft 548 of the gearbox 520 may be offset in a first direction from the motor drive shaft 504 by a distance, for example, the vertical direction shown in FIG. 5. Additionally or alternatively, the gearbox power output shaft 548 may be offset in a second direction from the motor drive shaft 504, for example, the horizontal direction shown in FIG. 5. In one embodiment, the gearbox power output shaft 548 may be offset in a third direction from the motor drive shaft 504 such that the output shaft axis 368 is offset in a direction into, or out of, the page a distance from the axis of the motor drive shaft 504. In any event, the offset may be set based on an arrangement of the gears in the gearbox 520.

As shown in FIG. 5, the motor drive shaft 504 may be directly connected to a drive gear 508. The drive gear 508 meshes with the intermediate driven gear 512 which is configured to rotate about the intermediate shaft 524. Power transmitted to the intermediate driven gear 512 may be caused to further transmit to an epicyclic reducer or other gear set. The epicyclic reducer can be a planetary, a star or a sun configuration. As shown in FIG. 5, the gear set may be a planetary stage reducer.

In some embodiments, the intermediate shaft 524 and sun gear 528 may be directly connected to (e.g., bolted, welded, press-fit, spline, keyed, etc.), or indirectly coupled with (e.g., via an additional shaft, special coupling, intermediate gears, etc.), the drive gear 508. Among other things, this arrangement allows the sun gear 528 to rotate in conjunction with the drive gear 508 (e.g., at the same or at a different speed, etc.). The sun gear 528 may engage with one or more planet gears 532 disposed around the sun gear 528. Each of the planet gears 532 may remain in constant mesh, or rotational contact, with both the sun gear 528 and the ring gear 540. For instance, the sun gear 528 may include teeth disposed at an outer diameter and along a periphery of the sun gear 528, while the ring gear 540 may include teeth disposed at an inner diameter and along an internal periphery of the ring gear 540, the planet gears 532 being disposed between the sun gear 528 and the ring gear 540. The planet gears 532 may be configured to rotate about planet gear shafts 536 that are interconnected with a carrier 544. In some embodiments, rotation of the sun gear 528 may impart a rotational force through the planet gears 532 to the carrier 544, causing the carrier 544 to rotate about the output shaft axis 368. For example, the carrier 544 may be connected to the power output shaft 548 of the gearbox 520 that rotates about the output shaft axis 368.

In some embodiments, at least one wheel 104A-D may be connected to the power output shaft 548 of the gearbox 520. As can be appreciated, the power output shaft 548 may correspond to one or more of the drive axles 106, 108, 112, 116 described in conjunction with FIGS. 1-3. In some embodiments, the power output shaft 548 and/or drive axles 106, 108, 112, 116 may be configured as drive half-shafts that are connected directly to the carrier 544 via a splined interconnection or through joint races directly machined into an inner diameter of the carrier 544.

The motor gearbox unit 500 may include a base 550, a gearbox housing 560, an inverter housing 570, and/or a motor housing 580 or end plate. The modular drive unit mounts described herein may be part of the base 550, housing 580, or other portion of the motor gearbox, or drive, unit 500. In some embodiments, one or more of the inverter 506, motor 516, and/or gearbox 520 may share a portion of a housing with each other and/or another component of the motor gearbox unit 500. In one embodiment, an integral or unified housing may be employed to efficiently route coolant lines, electrical interconnections, and/or save weight, space, and/or the number of required interconnections (e.g., fasteners, joints, etc.).

Figure 6:
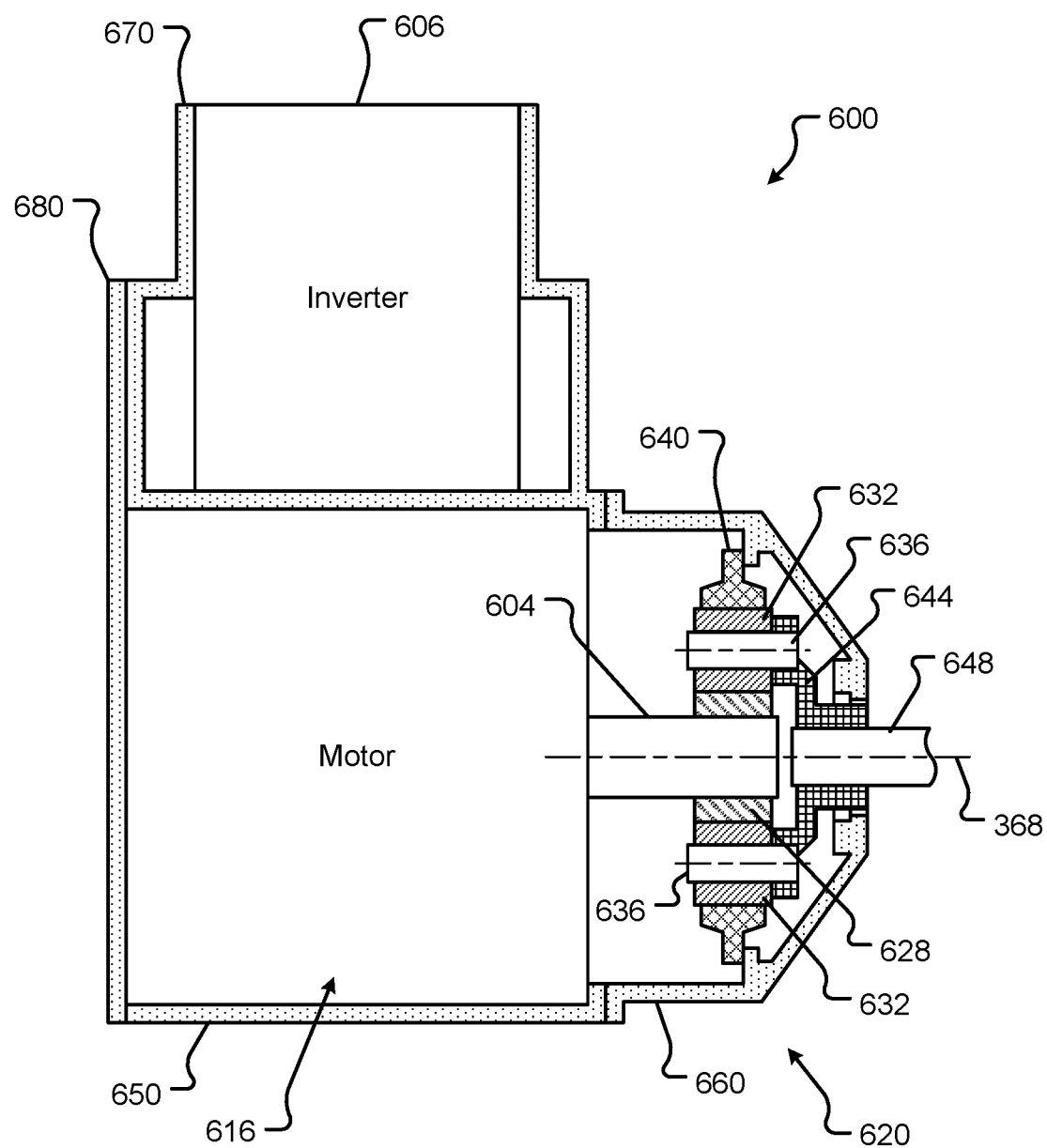
FIG. 6 shows a section view of a motor gearbox unit in accordance with embodiments of the present disclosure.

FIG. 6 shows a section view of a motor gearbox unit 600 in accordance with embodiments of the present disclosure. The motor gearbox unit 600 of FIG. 6 may be similar, if not identical, to the motor gearbox units 130, 130A-C and/or the drive units 700, 800 as described at least in conjunction with FIGS. 1-3, 7, and 8 and may include one or more features described in conjunction with the motor gearbox unit 500 FIG. 5. The motor gearbox unit 600 may include an electric motor 616 mechanically interconnected to a gearbox 620 via a motor drive shaft 604. As can be appreciated, the motor 616 may be similar, if not identical, to the motors 216, 516 described in conjunction with FIGS. 1-3, and 5. In some embodiments, the motor gearbox unit 600 may include an inverter 606 that receives DC power and outputs AC power to the motor 616. The inverter 606 may serve to regulate the power fed to the motor 616.

The motor gearbox unit 600 may include a motor 616 having a motor drive shaft 604 that is coaxial with a gearbox power output shaft 648. For instance, the motor drive shaft 604 may be arranged in-line with the power output shaft 648 of the gearbox 620. In this configuration, the axis of the motor drive shaft 604 may be colinear, and/or coaxial, with the output shaft axis 368 of the gearbox 620.

As shown in FIG. 6, the motor drive shaft 604 may be directly connected to an epicyclic reducer or other gear set. The epicyclic reducer can be a planetary, a star, or a sun configuration (e.g., a planetary stage reducer, etc.). For instance, the motor drive shaft 604 may be connected to a sun gear 628 that rotates in concert with the motor drive shaft 604. In some embodiments, the sun gear 628 may be directly connected to (e.g., bolted, welded, press-fit, spline, keyed, etc.), or indirectly coupled with (e.g., via an additional shaft, special coupling, intermediate gears, etc.), the drive shaft 604. The sun gear 628 may engage with one or more planet gears 632 disposed around the sun gear 628.

Each of the planet gears 632 may remain in constant mesh, or rotational contact, with both the sun gear 628 and the ring gear 640. For instance, the sun gear 628 may include teeth disposed at an outer diameter and along a periphery of the sun gear 628, while the ring gear 640 may include teeth disposed at an inner diameter and along an internal periphery of the ring gear 640, the planet gears 632 being disposed between the sun gear 628 and the ring gear 640. The planet gears 632 may be configured to rotate about planet gear shafts 636 that are interconnected with a carrier 644. In some embodiments, rotation of the sun gear 628 may impart a rotational force through the planet gears 632 to the carrier 644, causing the carrier 644 to rotate about the output shaft axis 368. For example, the carrier 644 may be connected to the power output shaft 648 of the gearbox 620 that rotates about the output shaft axis 368.

In some embodiments, at least one wheel 104A-D may be connected to the power output shaft 648 of the gearbox 620. As can be appreciated, the power output shaft 648 may correspond to one or more of the drive axles 106, 108, 112, 116 described in conjunction with FIGS. 1-3. In some embodiments, the power output shaft 648 and/or drive axles 106, 108, 112, 116 may be configured as drive half-shafts that are connected directly to the carrier 644 via a splined interconnection or through joint races directly machined into an inner diameter of the carrier 644.

The motor gearbox unit 600 may include a base 650, a gearbox housing 660, an inverter housing 670, and/or a motor housing 680 or end plate. In some embodiments, one or more of the inverter 606, motor 616, and/or gearbox 620 may share a portion of a housing with each other and/or another component of the motor gearbox unit 600. In one embodiment, an integral or unified housing may be employed to efficiently route coolant lines, electrical interconnections, and/or save weight, space, and/or the number of required interconnections (e.g., fasteners, joints, etc.).

Figure 7:
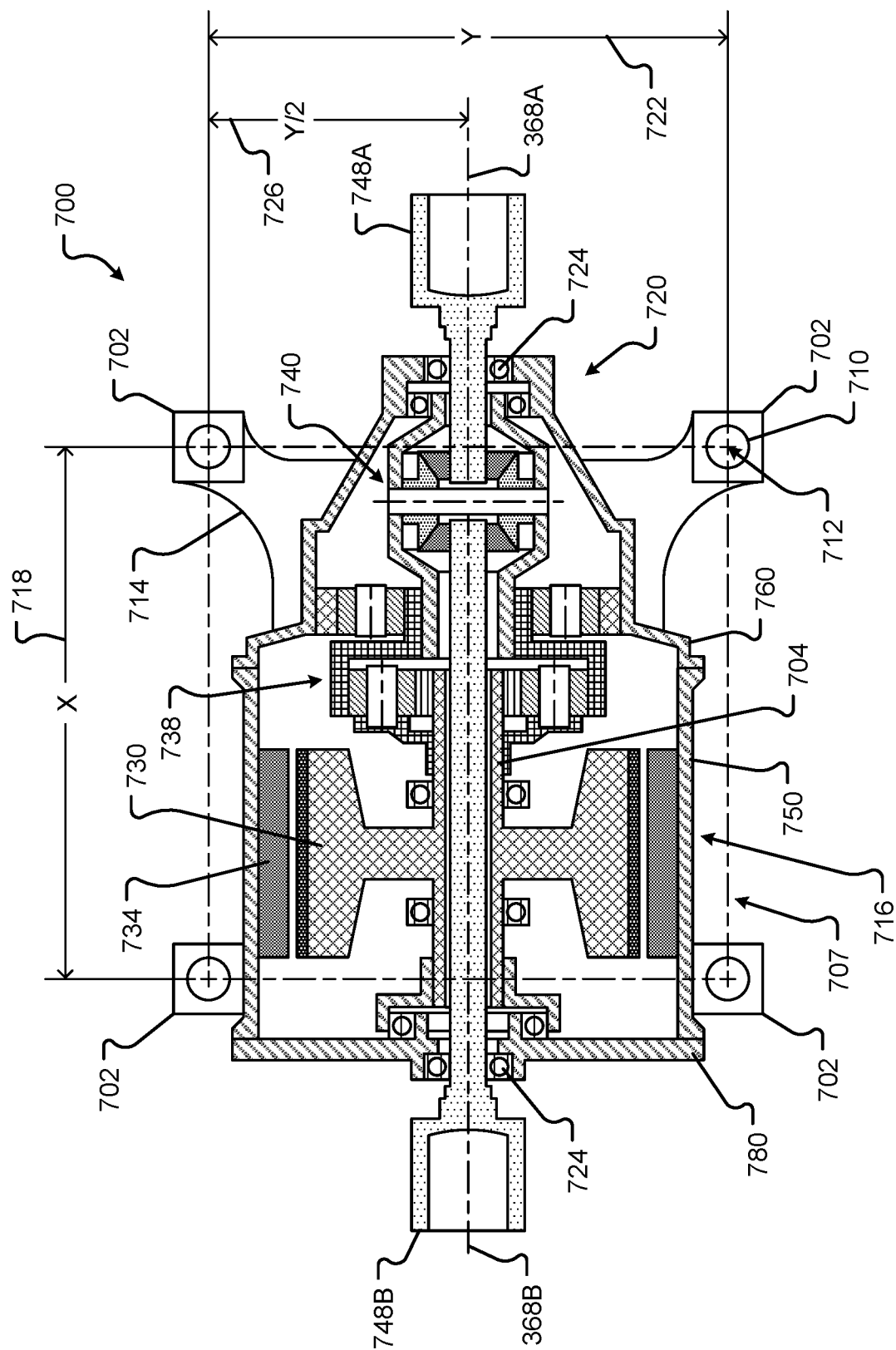
FIG. 7 shows a section view of a modular single-motor drive unit in accordance with embodiments of the present disclosure.

FIG. 7 shows a section view of a modular single-motor drive unit 700 in accordance with embodiments of the present disclosure. The section may be taken through a center of the single-motor drive unit 700 in a plan view. The single-motor drive unit 700 of FIG. 7 may include one or more features described in conjunction with the motor gearbox units 500, 600 of FIGS. 5 and 6. In some embodiments, the single-motor drive unit 700 may be configured to provide power to a first drive shaft 748A and a second drive shaft 748B via a single power output shaft 704A. For instance, the single-motor drive unit 700 may include a motor 716 having a rotor 730 and a stator 734. The rotor 730 may be supported by a number of bearings 724, such that energizing the motor 716 causes the rotor 730 to move relative to the stator 734. This movement may cause rotation of the power output shaft 704.

In some embodiments, the power output shaft 704 may be hollow and configured to surround a portion of at least one drive shaft 748A, 748B without directly contacting the at least one drive shaft 748A, 748B. For example, the hollow power output shaft 704 may include a clearance between an outer diameter of the at least one drive shaft 748A, 748B and an inner diameter of the hollow power output shaft 704. As shown in FIG. 7, a first drive shaft axis 368A of the first drive shaft 748A is coaxial with the second drive shaft axis 368B of the second drive shaft 748B. A portion of the power output shaft 704 may include a sun gear, or other engagement element, configured to engage with one or more transmission elements 738 in transmitting power from the motor 716 to a differential 740 and then to at least one drive shaft 748A, 748B. The transmission elements 738 may correspond to one or more planetary gear sets, epicyclic reducers, etc., and/or other gear sets configured to transmit power from the motor 716 to the at least one drive shaft 748A, 748B. In some embodiments, the transmission elements 738 may correspond to any of the gears 508, 512, 532, 540, 628, 632, 640, carriers 544, 644, shafts 524, 536, 548, 648, etc., as described in conjunction with FIGS. 5 and 6.

The single-motor drive unit 700 may include a base 750, a gearbox housing 760, and/or an end plate 780. The modular drive unit mounts 702 described herein may be part of the base 750, gearbox housing 760, or other portion of the drive unit 700. The modular drive unit mounts 702 may be connected to or formed in the housing via one or more connections 714 including, but in no way limited to, protrusions, extensions, legs, feet, tabs, recesses, etc., and/or other mechanical features. In some embodiments, one or more of the motor 716 and gearbox 720 may share a portion of a housing with each other and/or another component of the drive unit 700. The gearbox 720 may include at least a portion of the transmission elements 738, a differential 740, and/or a portion of the at least one drive shaft 748A, 748B. In some embodiments, the first drive shaft 748A and the second drive shaft 748B may be rotationally interconnected and linked to one or more gears in the differential 740 and may be rotationally supported by bearings 724 disposed in the gearbox housing 760 and end plate 780, respectively.

In one embodiment, the single-motor drive unit 700 may include a number of drive unit mount features 702 arranged in a drive unit mount pattern 707. The drive unit mount features 702 are configured to interface and align with one or more of the drive unit mounts 107A, 107B of the vehicle frame 102. The drive unit mount features 702 may be spaced apart from one another in the drive unit mount pattern 707, the drive unit mount pattern 707 having a specific size and shape. For instance, the drive unit mount pattern 707 may be configured to exactly match a common pattern associated with the drive unit mounts 107A, 107B of the vehicle frame 102 (e.g., where the pattern for the first drive unit mounts 107A is the same as the pattern for the second drive unit mounts 107B). In some embodiments, the drive unit mount pattern 707 may be configured as a bolt pattern.

As shown in FIG. 7, the drive unit mount pattern 707 may be configured as a rectangular pattern having a width distance 718, X, and a length distance 722, Y, separating one drive unit mount feature 702, or drive unit mount feature pair, from another. The drive unit mount features 702 may be configured as a series of holes, apertures, protrusions, or other attachment features, each having a feature size 710 (e.g., a diameter, perimeter, area, etc.) and an alignment, or feature, center 712. In one embodiment, the drive unit mount pattern 707 and distances 718, 722 may be measured between centers 712 of each feature 702. Although shown as a rectangular pattern, it should be appreciated, that the drive unit mount features 702 may be part of a circular pattern with a center disposed at the drive axis centerline of the single-motor drive unit 700. Additionally or alternatively, while the drive unit mount pattern 707 is shown including four drive unit mount features 702, pairs of which are symmetrical about the coaxial drive shaft axes 368A, 368B, it should be appreciated that any number of drive unit mount features 702 may be included. For instance, where three drive unit mount features 702 are used, a pair of features 702 may be disposed on one side of the drive axis centerline of the drive unit 700 and a single feature 702 may be disposed on the opposite side of the drive axis centerline. Among other things, this nonsymmetrical pattern of three drive unit mount features 702 (not shown) may provide a foolproof mounting system for assembling a drive unit 700 to a vehicle frame 102.

In some embodiments, a distance 726 (i.e., Y/2) from at least one drive unit mount feature 702 to the coaxial drive shaft axes 368A, 368B may be half of the distance 722 (i.e., Y) between drive unit mount features 702 disposed about the coaxial drive shaft axes 368A, 368B. In any event, the drive unit mount pattern 707 for the single-motor drive unit 700 matches the pattern of the drive unit mounts 107A, 107B associated with the vehicle frame 102.

Figure 8:
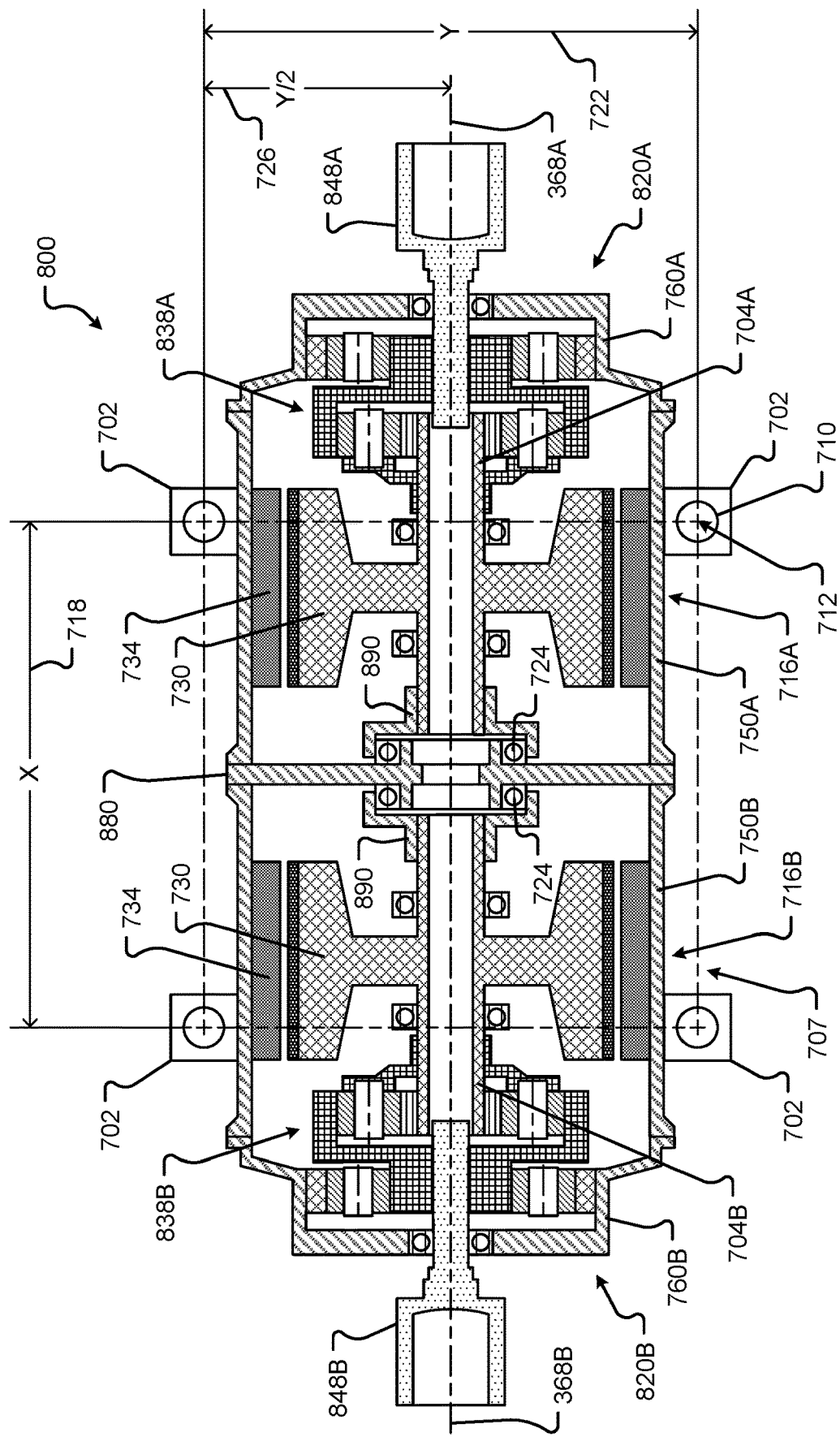
FIG. 8 shows a section view of a modular multiple-motor drive unit in accordance with embodiments of the present disclosure.

FIG. 8 shows a section view of a modular multiple-motor drive unit 800 in accordance with embodiments of the present disclosure. The section may be taken through a center of the multiple-motor drive unit 800 in a plan view. The multiple-motor drive unit 800 of FIG. 8 may include one or more features described in conjunction with the motor gearbox units 500, 600 of FIGS. 5 and 6 and/or the modular single-motor drive unit 700 of FIG. 7. In some embodiments, the multiple-motor drive unit 800 may be configured to provide power to a first drive shaft 848A and a second drive shaft 848B via two independent motors 716A, 716B having first and second power output shafts 704A, 704B. For instance, the multiple-motor drive unit 800 may include a two motors 716A, 716B, each having a rotor 730 and a stator 734. The rotor 730 may be supported by a number of bearings 724, such that energizing of the first or second motor 716A, 716B causes the respective rotor 730 to move relative to the respective stator 734. This movement may cause rotation of the respective power output shaft 704A, 704B.

In some embodiments, the power output shafts 704A, 704B may be hollow and configured to surround a portion of at least one drive shaft 848A, 848B without directly contacting the at least one drive shaft 848A, 848B. For example, the hollow power output shafts 704A, 704B may include a clearance between an outer diameter of the at least one drive shaft 848A, 848B and an inner diameter of the hollow power output shafts 704A, 704B. As shown in FIG. 8, a first drive shaft axis 368A of the first drive shaft 848A is coaxial with the second drive shaft axis 368B of the second drive shaft 848B. A portion of each power output shaft 704A, 704B may include a sun gear, or other engagement element, configured to engage with one or more transmission elements 838A, 838B in transmitting power from the motor 716A, 716B to a respective drive shaft 848A, 848B. The transmission elements 838A, 838B may correspond to one or more planetary gear sets, epicyclic reducers, etc., and/or other gear sets configured to transmit power from the motors 716A, 716B to the at least one drive shaft 848A, 848B. In some embodiments, the transmission elements 838A, 838B may correspond to any of the gears 508, 512, 532, 540, 628, 632, 640, carriers 544, 644, shafts 524, 536, 548, 648, etc., as described in conjunction with FIGS. 5 and 6. Because the multiple-motor drive unit 800 may include two independent motors 716A, 716B, (e.g., a first motor 716A to provide power to the first drive shaft 848A, and a second independent motor 716B to provide power to the second drive shaft 848B) there is no need for a differential to transmit power from a single motor to both drive shafts 848A, 848B.

The multiple-motor drive unit 800 may include a base 750A, 750B, a gearbox housing 760A, 760B, and a bulkhead 880. The bulkhead 880 may be include features to mount a first motor 716A, base 750A and gearbox housing 760A to a second motor 716B, base 750B and gearbox housing 760B. In some cases, the bulkhead 880 may include a bearing 724 disposed on one side to support a portion of the first power output shaft 704A and a bearing 724 disposed on the other side of the bulkhead 880 to support a portion of the second power output shaft 704B. In some embodiments, the first and second power output shafts 704A, 704B may be supported by the bearing 724 via independent coupling members 890. This multiple bearing arrangement allows each motor 716A, 716B of the multiple-motor drive unit 800 to spin independently of the other and without transmitting power from the first motor 716A to the second motor 716B, or vice versa.

The modular drive unit mounts 702 described herein may be part of one or more base 750A, 750B, gearbox housing 760A, 760B, or other portion of the multiple-motor drive unit 800. The modular drive unit mounts 702 may be connected to or formed in a portion of the multiple-motor drive unit 800 via one or more connections including, but in no way limited to, protrusions, extensions, legs, feet, tabs, recesses, etc., and/or other mechanical features. In some embodiments, one or more of the motors 716A, 716B and gearboxes 820A, 820B may share a portion of a housing with each other and/or another component of the multiple-motor drive unit 800. The gearboxes 820A, 820B may include at least a portion of the transmission elements 838A, 838B, and/or a portion of the at least one drive shaft 848A, 848B. In some embodiments, the first drive shaft 848A and the second drive shaft 848B of the multiple-motor drive unit 800 may be electronically controlled to rotate in unison with one another and/or independently from one another.

The multiple-motor drive unit 800 may include a number of drive unit mount features 702 arranged in the same drive unit mount pattern 707 described in conjunction with FIG. 7. As can be appreciated, this arrangement allows the drive unit mount features 702 of the multiple-motor drive unit 800 to interface and align with one or more of the drive unit mounts 107A, 107B of the vehicle frame 102. The drive unit mount features 702 may be spaced apart from one another in the drive unit mount pattern 707, the drive unit mount pattern 707 having a specific size and shape. For instance, the drive unit mount pattern 707 may be configured to exactly match a common pattern associated with the drive unit mount pattern 707 of the single-motor drive unit 700 and the drive unit mounts 107A, 107B of the vehicle frame 102 (e.g., where the pattern for the first drive unit mounts 107A is the same as the pattern for the second drive unit mounts 107B). In some embodiments, the drive unit mount pattern 707 may be configured as a bolt pattern.

Having the same drive unit mount pattern 707 as the single-motor drive unit 700 allows the multiple drive unit 800 to be exchanged for a single-motor drive unit 700, and/or vice versa. It is an aspect of the present disclosure that engaging a single-motor drive unit 700 with the vehicle frame 102 utilizes the exact same mount features as engaging a multiple-motor drive unit 800 with the vehicle frame 102. For example, if four bolts and bolt holes in the vehicle frame 102 are used to mount the single-motor drive unit 700 at a particular mount area, the same four bolts and bolt holes (e.g., not a different combination of bolts and bolt holes, etc.) may be used to mount a multiple-motor drive unit 800 in place of the single-motor drive unit 700 at the particular mount area.

The modular mount system described herein allows a single-motor drive unit 700 or a multiple-motor drive unit 800 to be mounted to a vehicle frame 102 using the same mounting points. This modularity provides reductions in production costs by utilizing as many of the same components as possible in assembly. Moreover, several different vehicle configurations can be produced using the same motor in different drive unit 700, 800 combinations.

Figure 9:
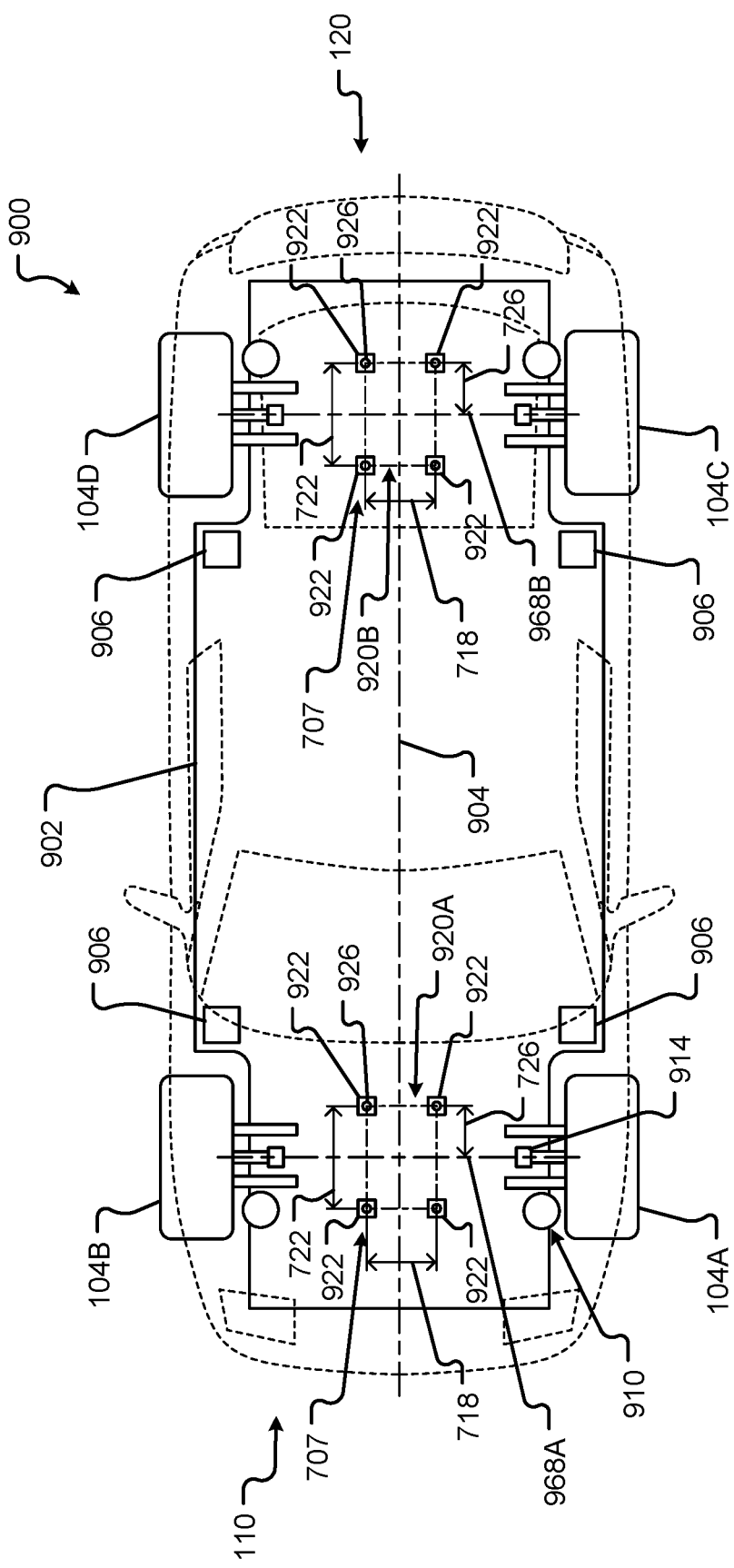
FIG. 9 shows a modular drivetrain platform for a vehicle in accordance with embodiments of the present disclosure.

FIG. 9 shows a modular drivetrain platform 900 for an electric vehicle 100 in accordance with embodiments of the present disclosure. The modular drivetrain platform 900 may include a frame 902 (e.g., the vehicle frame 102 described in conjunction with FIGS. 1-8, etc.) including one or more body mount points 906, drivetrain components (e.g., suspension elements 910, drive axles or half shafts 914, etc.), a first modular drive unit mount set 920A disposed adjacent to the front 110 of the vehicle 100, and a second modular drive unit mount set 920B disposed adjacent to the rear 120 of the vehicle 100. As shown in FIG. 9, the first modular drive unit mount set 920A may include a number of mount features 922 symmetrically disposed about a front drive shaft axis 968A, and the second modular drive unit mount set 920B may include a number of mount features 922 symmetrically disposed about a rear drive shaft axis 968B. The mount features 922 may correspond to the frame drive unit mounts 107A, 107B as described in conjunction with FIGS. 1-8 above. In any event, the mount features 922 of the first and second modular drive unit mount sets 920A, 920B have the same mount pattern 707 as the drive units 700, 800.

The mount features 922 may be configured as a series of tapped holes, apertures, protrusions, or other attachment features, each having a feature size 922 (e.g., a diameter, perimeter, area, etc.) and an alignment, or feature, center. In one embodiment, the mount pattern 707 and distances 718, 722 for the mount features 922 of the vehicle frame 902 may be identical to the spacing, geometry, distances, and arrangement as described in conjunction with FIGS. 7 and 8. Although shown as a rectangular pattern, it should be appreciated, that the mount features 922 of the first and second modular drive unit mount set 920A, 920B may be part of a circular pattern with a center disposed at the front and second drive shaft axis 968A, 968B, respectively. In any event, the mount patterns 707 for the mount features 922 of the first and second modular drive unit mount set 920A, 920B are the same.

Referring now to FIGS. 10A-10F, various schematic plan views of different drivetrain configurations 1000A-1000F for a modular drivetrain platform 900 are shown in accordance with embodiments of the present disclosure. The same modular drivetrain platform 900 and frame 902 may be configured with one-drivetrain or two-drivetrain configurations (as shown in FIGS. 10A-10F), where each drivetrain may receive a single-motor or a multiple-motor drive unit 700, 800 attachable via the same mount points. The vehicle platform 900 is shown including a first mount area disposed adjacent to the vehicle front 110 and a second mount area disposed adjacent to the vehicle rear 120. A vehicle centerline 904 is shown bisecting the vehicle platform 900 from the front 110 to the rear 120. In some embodiments, the mount features 922 of the first and second modular drive unit mount set 920A, 920B may be symmetrically disposed about both the vehicle centerline 904 and a drive shaft axis 968 for a set of wheels 104A-D.

Figure 10C:
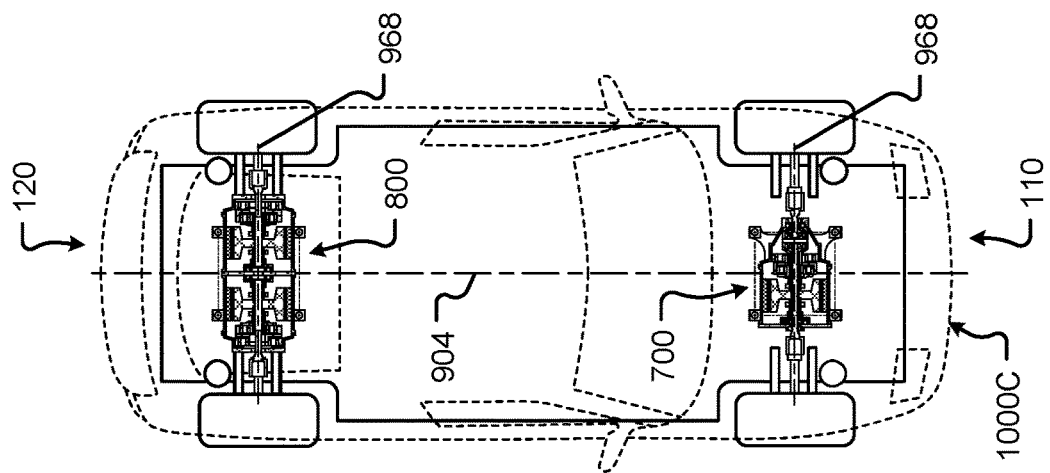
FIG. 10C shows a schematic plan view of an all-wheel drive drivetrain configuration for a modular drivetrain platform in accordance with embodiments of the present disclosure.
Figure 10B:
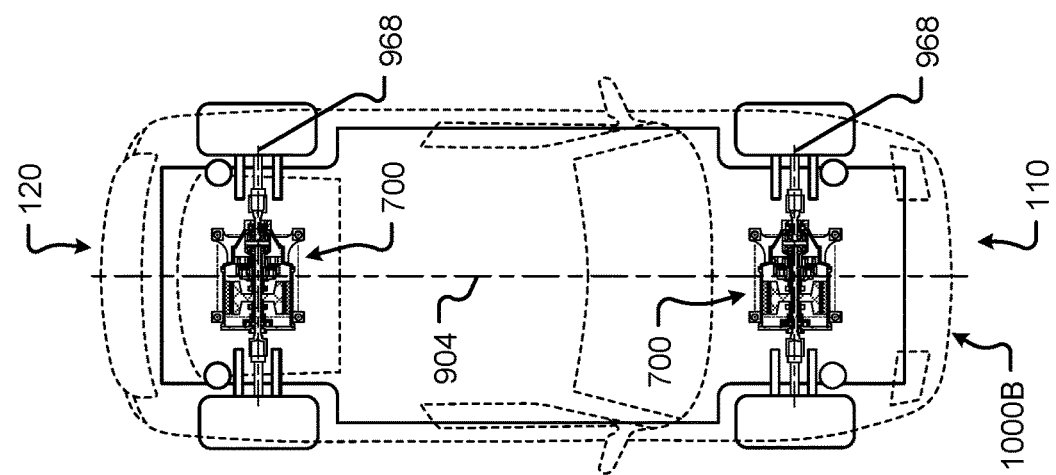
FIG. 10B shows a schematic plan view of an all-wheel drive drivetrain configuration for a modular drivetrain platform in accordance with embodiments of the present disclosure.
Figure 10A:
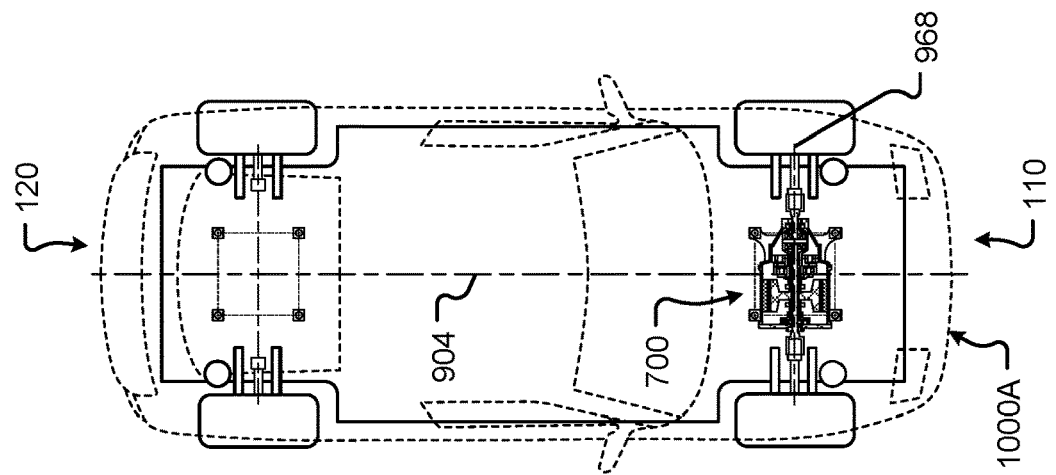
FIG. 10A shows a schematic plan view of a front-wheel drive drivetrain configuration for a modular drivetrain platform in accordance with embodiments of the present disclosure.

FIG. 10A shows a schematic plan view of a front-wheel drive drivetrain configuration 1000A in accordance with embodiments of the present disclosure. The front-wheel drive drivetrain configuration 1000A of FIG. 10A includes one single-motor drive unit 700 mounted at the vehicle front 110. This configuration 1000A provides a front-wheel drivetrain option for a vehicle 100. In the front-wheel drive drivetrain option of FIG. 10A, there is no motor drive unit shown at the rear 120 of the vehicle platform 900 although the mount features 922 in the second modular drive unit mount set 920B remain for future expansion and/or reconfiguration. In some embodiments, the single-motor drive unit 700 in a front or rear-wheel drive drivetrain option may correspond to an "economy" or low cost drivetrain option.

FIG. 10B shows a schematic plan view of an all-wheel drive drivetrain configuration 1000B in accordance with embodiments of the present disclosure. The all-wheel drive drivetrain configuration 1000B of FIG. 10B includes two single-motor drive units 700, with one single-motor drive unit 700 mounted at the vehicle front 110 and one single-motor drive unit 700 mounted at the vehicle rear 120 (e.g., via the first and second modular drive unit mount sets 920A, 920B). This configuration 1000B provides an all-wheel drive drivetrain option for a vehicle 100. In some embodiments, two single-motor drive units 700 used in an all-wheel drive drivetrain option may correspond to a "standard" or normal cost drivetrain option.

FIG. 10C shows a schematic plan view of another all-wheel drive drivetrain configuration 1000C in accordance with embodiments of the present disclosure. The all-wheel drive drivetrain configuration 1000C of FIG. 10C includes a single-motor drive unit 700 mounted at the vehicle front 110 and a multiple-motor drive unit 800 mounted at the vehicle rear 120 (e.g., via the first and second modular drive unit mount sets 920A, 920B). This configuration 1000C provides an enhanced power all-wheel drive drivetrain option for a vehicle 100. In some embodiments, including a single-motor drive unit 700 in a front or rear drivetrain position and a multiple-motor drive unit 800 in the other of the front or rear drivetrain position may correspond to a "sport" or high cost all-wheel drive drivetrain option.

Figure 10F:
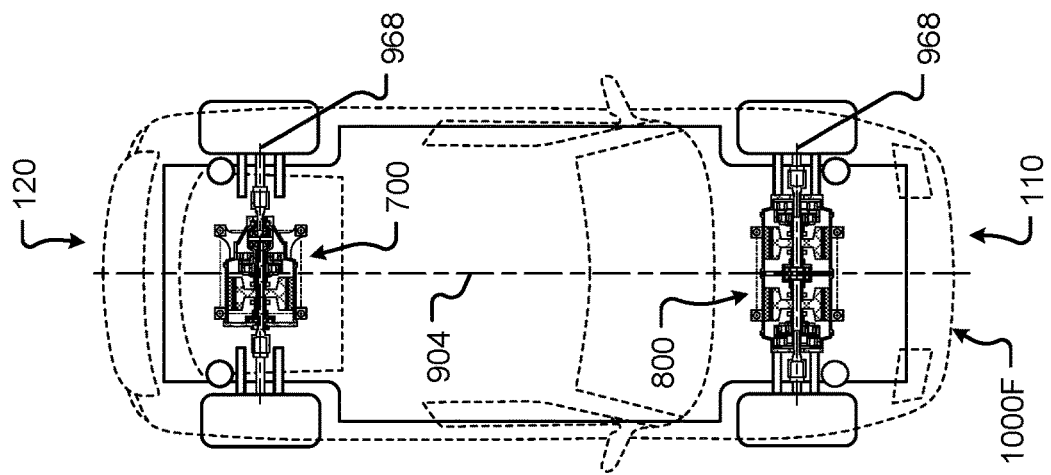
FIG. 10F shows a schematic plan view of a rear-wheel drive drivetrain configuration for a modular drivetrain platform in accordance with embodiments of the present disclosure.
Figure 10E:
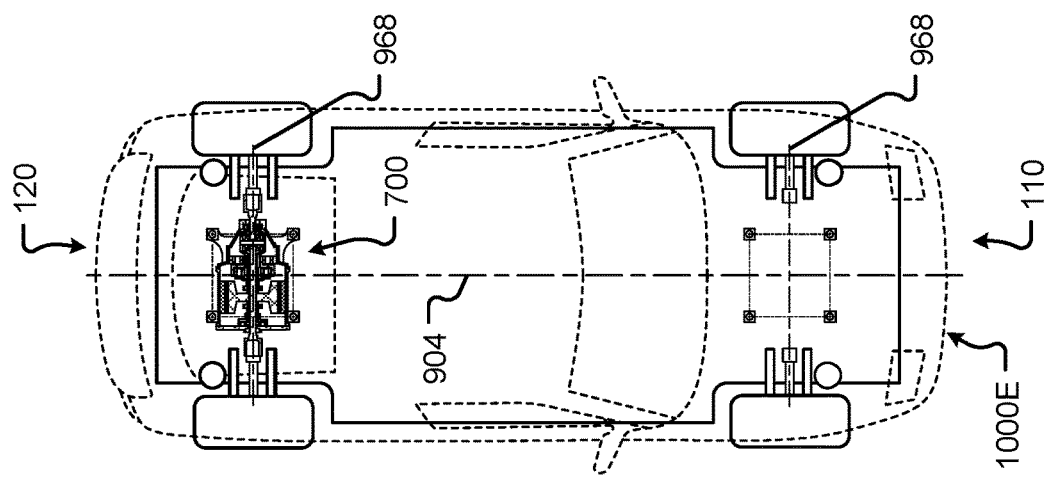
FIG. 10E shows a fifth drivetrain configuration for a vehicle platform in accordance with embodiments of the present disclosure.
Figure 10D:
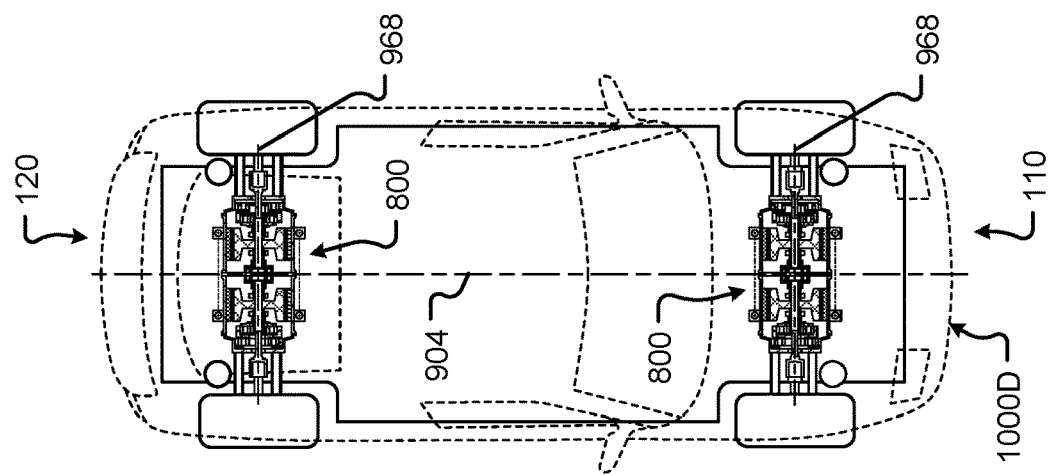
FIG. 10D shows a schematic plan view of an all-wheel drive drivetrain configuration for a modular drivetrain platform in accordance with embodiments of the present disclosure.

FIG. 10D shows a schematic plan view of yet another all-wheel drive drivetrain configuration 1000D in accordance with embodiments of the present disclosure. The all-wheel drive drivetrain configuration 1000D of FIG. 10D includes two multiple-motor drive units 800, with one multiple-motor drive unit 800 mounted at the vehicle front 110 and one multiple-motor drive unit 800 mounted at the vehicle rear 120 (e.g., via the first and second modular drive unit mount sets 920A, 920B). This configuration 1000D provides a premium all-wheel drive drivetrain option for a vehicle 100. In some embodiments, two multiple-motor drive units 800 used in an all-wheel drive drivetrain option may correspond to a "premium sport" or highest cost drivetrain option.

FIG. 10E shows a schematic plan view of a rear-wheel drive drivetrain configuration 1000E in accordance with embodiments of the present disclosure. The rear-wheel drive drivetrain configuration 1000E of FIG. 10E includes one single-motor drive unit 700 mounted at the vehicle rear 120. This configuration 1000E provides a rear-wheel drive drivetrain option for a vehicle 100. In the rear-wheel drive drivetrain option of FIG. 10E, there is no motor drive unit shown at the front 110 of the vehicle platform 900 although the mount features 922 in the first modular drive unit mount set 920A remain for future expansion and/or reconfiguration. As provided above, the single-motor drive unit 700 in a front or rear-wheel drive drivetrain option may correspond to an "economy" or low cost drivetrain option.

FIG. 10F shows a schematic plan view of yet another all-wheel drive drivetrain configuration 1000F in accordance with embodiments of the present disclosure. The all-wheel drive drivetrain configuration 1000F of FIG. 10F includes a multiple-motor drive unit 800 mounted at the vehicle front 110 and a single-motor drive unit 700 mounted at the vehicle rear 120 (e.g., via the first and second modular drive unit mount sets 920A, 920B). This configuration 1000F provides an enhanced power all-wheel drive drivetrain option for a vehicle 100. In some embodiments, including a multiple-motor drive unit 800 in a front or rear drivetrain position and a single-motor drive unit 700 in the other of the front or rear drivetrain position may correspond to a "sport" or high cost all-wheel drive drivetrain option.

It should be appreciated that any of the drivetrain configurations 1000A-1000F may be selected based on consumer demand, performance requirements, etc., and/or power output desired or predetermined for the vehicle 100 at any given time. For example, a vehicle owner may wish to configure a vehicle 100 including a front or rear-wheel drive drivetrain (e.g., configurations 1000A, 1000E) during the summer months (as conditions may only require limited power and/or control) and reconfigure the vehicle 100 to include an all-wheel drive drivetrain (e.g., configurations 1000B, 1000C, 1000D, 1000F) during the winter months (e.g., where the weather may require better traction and/or control). In any event, the modular drivetrain platform 900 allows the vehicle 100 to be reconfigured by simply replacing one motor drive unit for another and/or adding or removing motor drive units as required via the first and second modular drive unit mount sets 920A, 920B having common mount patterns 707 and mount features 922.

Although represented by gears in the present disclosure, it should be appreciated that the interconnection between one or more of the rotating elements in the motor gearbox, or drive, units 500, 600, 700, 800 etc. may include, but is in no way limited to, one or more belts, pulleys, chains, fluid contacting surfaces, linkages, and/or combinations thereof.

Figure 11:
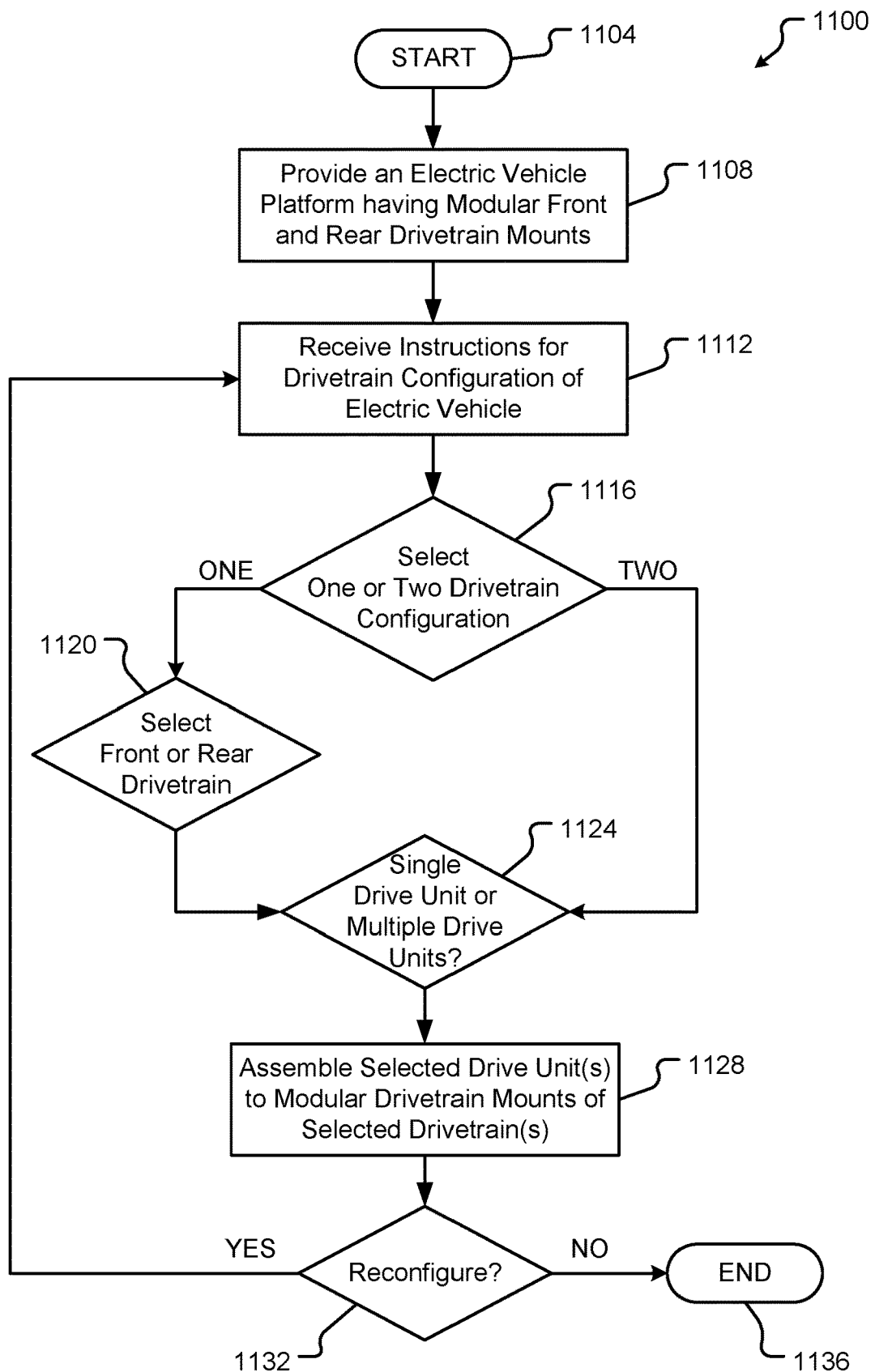
FIG. 11 is a flow diagram of a method for assembling a modular motor gearbox unit and drive system to a modular drivetrain platform in accordance with embodiments of the present disclosure.

FIG. 11 is a flow diagram of a method 1100 for assembling a modular motor gearbox unit and drive system to a modular drivetrain platform 900 in accordance with embodiments of the present disclosure. While a general order for the steps of the method 1100 is shown in FIG. 11, the method 1100 can include more or fewer steps or can arrange the order of the steps differently than those shown in FIG. 11. Generally, the method 1100 starts with a start operation 1104 and ends with an end operation 1136. The method 1100 can be executed as a set of computer-executable instructions executed by a controller, and/or computer system (e.g., computer system 400 described in conjunction with FIG. 4), and encoded or stored on a computer readable medium or memory. Hereinafter, the method 1100 shall be explained with reference to the systems, components, assemblies, devices, environments, etc. described in conjunction with FIGS. 1-10F.

The method 1100 begins at step 1104 and continues by providing an electric vehicle platform 900 having modular front and rear drivetrain mounts 920A, 920B (step 1108). In some embodiments, providing the electric vehicle platform 900 may include conveying or otherwise presenting the vehicle platform 900 to an assembly system, manufacturing system, and/or a motor drive unit assembly machine.

Next, the method 1100 continues by receiving instructions for a drivetrain configuration for the vehicle 100 (step 1112). In some embodiments, the instructions may be received via a processor associated with a computer system, an assembly system, or other machine. The instructions may be based on information (e.g., provided by a user via an input device, an assembly output definition, a quota, and/or a manufacturing specification, etc.) defining a power output, motor drive unit combination, and/or a drivetrain number and position for the vehicle 100.

The instructions may be analyzed via the processor and the method 1100 may continue by selecting an appropriate one or two-drivetrain configuration for the vehicle 100 matching the information in the instructions (step 1116). If a one-drivetrain configuration is selected, the method 1100 may continue by determining whether the instructions specify a front-wheel drive or a rear-wheel drive drivetrain configuration for the vehicle 100 and selecting the appropriate configuration (step 1120). Next, the method 1100 continues by selecting a single-motor drive unit 700 or a multiple-motor drive unit 800 for the front and/or rear-wheel drive configuration selected in steps 1116 and/or 1120 (step 1124). This selection may be based on a performance output, traction control, and/or power output designated for the vehicle 100. In some cases, this designation may be included in the information of the instructions received.

The method 1100 proceeds by assembling the selected drive unit(s) to the modular drivetrain mounts (e.g., first modular drive unit mount set 920A, the second modular drive unit mount set 920B, and/or the first and second modular drive unit mount sets 920A, 920B) of the modular drivetrain platform 900 (step 1128). In one embodiment, the assembly may include directing one or more robots, end-effectors, pick-and-places, conveyors, or assembly machines to automatically interconnect a selected motor drive unit to a particular mount set 920A, 920B of the vehicle platform 900.

In some cases, a vehicle platform 900 including one or more motor drive units 700, 800 may be reconfigured to, among other things, alter a drivetrain option selected, a drive unit 700, 800 selected, and/or some other characteristic of the modular drivetrain platform 900 (step 1132). This reconfiguration may be made during or after assembly of the modular drivetrain platform 900. For instance, the reconfiguration may be determined after a vehicle 100 has been returned to a manufacturing or maintenance facility to alter the capabilities of a vehicle 100 to suit a given requirement (e.g., seasonal reconfiguring, performance reconfiguring, etc.). In the event that the modular drivetrain platform 900 requires reconfiguration, the method 1100 may return to step 1112 where instructions defining the reconfiguration may be received by the processor. If the modular drivetrain platform 900 does not require reconfiguration, the method 1100 may end at step 1136.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a modular drivetrain platform for an electric vehicle, comprising: a vehicle frame having a first end portion and a second end portion opposite the first end portion, the vehicle frame comprising: a first modular drive unit mount set including first mount features spaced apart from one another in a first mount pattern having a first size and shape, the first modular drive unit mount set disposed adjacent to the first end portion of the vehicle frame; and a second modular drive unit mount set including second mount features spaced apart from one another in a second mount pattern having the first size and shape, such that the first mount pattern and first mount features match the second mount pattern and second mount features, the second modular drive unit mount set disposed adjacent to the second end portion of the vehicle frame; wherein the first mount features and the second mount features are both configured to interchangeably engage with and retain a single-motor drive unit and a multiple-motor drive unit via drive unit mount features of the single-motor drive unit and drive unit mount features of the multiple-motor drive unit, both drive unit mount features having a drive unit mount pattern having the first size and shape and matching the first mount pattern.

Aspects of the above modular drivetrain platform include wherein interchangeably engaging with and retaining a single-motor drive unit and a multiple-motor drive unit includes utilizing each mount feature in the first and second mount features, such that each mount feature in the first and second mount features used to engage with and retain the single-motor drive unit are used to engage with and retain the multiple-motor drive unit. Aspects of the above modular drivetrain platform include wherein the single-motor drive unit includes a single motor with a single power output shaft to transmit power to a first drive shaft and a second drive shaft via power transmission elements contained therein. Aspects of the above modular drivetrain platform include wherein the multiple-motor drive unit includes two independent motors, a first motor of the two independent motors having a first power output shaft to transmit power to a first drive shaft, and a second motor of the two independent motors having a second power output shaft to transmit power to a second drive shaft, wherein the first and second motors are capable of operating independently of one another. Aspects of the above modular drivetrain platform include wherein the two independent motors of the multiple-motor drive unit are arranged back-to-back at a bulkhead, the two independent motors having coaxial first and second power output shafts. Aspects of the above modular drivetrain platform include wherein the first power output shaft is supported at one end via a first bearing disposed in the bulkhead and the second power output shaft is supported at one end via a second bearing disposed in the bulkhead, wherein the first and second bearings are allowed to rotate about an axis of the power output shafts independently of one another. Aspects of the above modular drivetrain platform further comprise: a first drive unit mounted to the vehicle frame via the first modular drive unit mount set, the first drive unit configured to provide front-wheel drive traction power for the electric vehicle; and a second drive unit mounted to the vehicle frame via the second modular drive unit mount set, the second drive unit configured to provide rear-wheel drive traction power for the electric vehicle; wherein the first drive unit and the second drive unit are selected from one of the single-motor drive unit and the multiple-motor drive unit and based on a drivetrain configuration for the electric vehicle. Aspects of the above modular drivetrain platform include wherein a front-wheel drive drivetrain configuration includes the single-motor drive unit or the multiple-motor drive unit disposed in the first end portion of the electric vehicle, a rear-wheel drive drivetrain configuration includes the single-motor drive unit or the multiple-motor drive unit disposed in the second end portion of the electric vehicle, and an all-wheel drive drivetrain configuration includes the single-motor drive unit or the multiple-motor drive unit disposed in the first and second end portions of the electric vehicle.

Embodiments include a vehicle frame for an electric vehicle having a front portion and a rear portion opposite the front portion, the vehicle frame comprising: a front-wheel drive unit mount disposed adjacent to the front portion of the vehicle frame, wherein the front-wheel drive unit mount includes a frame bolt pattern configured to engage with a drive unit bolt pattern of a front-wheel drive unit; and a rear-wheel drive unit mount disposed adjacent to the rear portion of the vehicle frame, wherein the rear-wheel drive unit mount includes the frame bolt pattern configured to engage with a drive unit bolt pattern of a rear-wheel drive unit; wherein the frame bolt pattern disposed adjacent to the front portion of the vehicle frame is the same as the frame bolt pattern disposed adjacent to the rear portion of the vehicle frame, and wherein each frame bolt pattern is configured to interchangeably engage with and retain a selected single-motor drive unit and a multiple-motor drive unit by utilizing all receiving features in the frame bolt pattern regardless of the selected drive unit.

Aspects of the above vehicle frame include wherein the single-motor drive unit includes a single motor having a single power output shaft to transmit power to a first drive shaft and a second drive shaft via power transmission elements and a differential contained in the single-motor drive unit. Aspects of the above vehicle frame include wherein the multiple-motor drive unit includes two independent motors, a first motor of the two independent motors having a first power output shaft to transmit power to a first drive shaft, and a second motor of the two independent motors having a second power output shaft to transmit power to a second drive shaft, wherein the first and second motors are capable of operating independently of one another. Aspects of the above vehicle frame include wherein the multiple-motor drive unit includes at least one planetary gear set and does not include a differential. Aspects of the above vehicle frame include wherein the two independent motors of the multiple-motor drive unit are arranged back-to-back at a bulkhead, the two independent motors having coaxial first and second power output shafts. Aspects of the above vehicle frame include wherein the first power output shaft is supported at one end via a first bearing disposed in the bulkhead and the second power output shaft is supported at one end via a second bearing disposed in the bulkhead, wherein the first and second bearings are allowed to rotate about an axis of the power output shafts independently of one another. Aspects of the above vehicle frame include wherein the single-motor drive unit and the multiple-motor drive unit each include a drive unit bolt pattern that matches the frame bolt pattern. Aspects of the above vehicle frame include wherein the frame bolt pattern and the drive unit bolt pattern each include four bolt location features. Aspects of the above vehicle frame include wherein two of the four bolt location features are disposed on one side of a vehicle drive shaft axis and another two of the four bolt location features are symmetrically disposed on an opposite side of the vehicle drive shaft axis. Aspects of the above vehicle frame include wherein a set of the four bolt location features of the frame bolt pattern are disposed on one side of a vehicle centerline and another two of the four bolt location features of the frame bolt pattern are symmetrically disposed on an opposite side of the vehicle centerline.

Embodiments include a method for configuring a modular drivetrain platform for a vehicle, comprising: providing a vehicle frame having a front portion and a rear portion opposite the front portion, the vehicle frame comprising: a first modular drive unit mount set including first mount features spaced apart from one another in a first mount pattern having a first size and shape, the first modular drive unit mount set disposed adjacent to the front portion of the vehicle frame; and a second modular drive unit mount set including second mount features spaced apart from one another in a second mount pattern having the first size and shape, such that the first mount pattern and first mount features match the second mount pattern and second mount features, the second modular drive unit mount set disposed adjacent to the rear portion of the vehicle frame; wherein the first mount features and the second mount features are both configured to interchangeably engage with and retain a single-motor drive unit and a multiple-motor drive unit via drive unit mount features of the single-motor drive unit and drive unit mount features of the multiple-motor drive unit, both drive unit mount features having a drive unit mount pattern having the first size and shape and matching the first mount pattern; selecting, via a processor and based on configuration instructions received, a one-drivetrain or a two-drivetrain configuration for the vehicle; selecting, via the processor when the one-drivetrain configuration is selected, a front-wheel drivetrain or a rear-wheel drivetrain configuration for the vehicle; selecting, via the processor, a particular drive unit for the selected front-wheel drivetrain or rear-wheel drivetrain configuration, wherein the particular drive unit is selected from the single-motor drive unit or the multiple-motor drive unit; and assembling the particular drive unit to the vehicle frame via the first mount pattern when the front-wheel drivetrain configuration is selected and via the second mount pattern when the rear-wheel drivetrain configuration is selected, wherein the particular drive unit is mounted to the vehicle frame utilizing all mount features of the first or second mount features regardless of the particular drive unit selected.

Aspects of the above method further comprising: determining, via the processor, a reconfigured vehicle drivetrain platform assembled including a different number of drivetrains, a different front-wheel or rear-wheel configuration, and/or a different single-motor or multiple-motor drive unit for the vehicle; and assembling the reconfigured vehicle drivetrain platform using the first or second mount features regardless of the reconfigured components selected; wherein the one-drivetrain configuration provides a front-wheel drive or a rear-wheel drive vehicle, and wherein the two-drivetrain configuration provides an all-wheel drive vehicle.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity, e.g., by using a range extender unit, etc. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors or any kind of pressurized media such as air, etc.). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A modular drivetrain platform for an electric vehicle, comprising:
    a vehicle frame having a first end portion and a second end portion arranged opposite the first end portion, the vehicle frame comprising:
        at least one mount surface extending from the first end portion of the vehicle frame to the second end portion of the vehicle frame;
        a first modular drive unit mount set including first mount features spaced apart from one another in a first mount pattern having a first size and shape, the first modular drive unit mount set disposed in the at least one mount surface offset a first distance from the first end portion of the vehicle frame; and
        a second modular drive unit mount set including second mount features spaced apart from one another in a second mount pattern having the first size and shape, such that the first mount pattern and first mount features match the second mount pattern and second mount features, respectively, the second modular drive unit mount set being disposed in the at least one mount surface offset a second distance from the second end portion of the vehicle frame;
        wherein the first mount features and the second mount features are each configured to interchangeably engage with and retain a single-motor drive unit and a multiple-motor drive unit in a mounted position to the at least one mount surface via drive unit mount features formed from a portion of a motor of the single-motor drive unit and drive unit mount features formed from a portion of at least one motor of the multiple-motor drive unit, both drive unit mount features having a drive unit mount pattern having the first size and shape and matching the first mount pattern, and wherein, in the mounted position, at least one of the single-motor drive unit and the multiple-motor drive unit is disposed between the first end portion of the vehicle frame and the second end portion of the vehicle frame.

2. The modular drivetrain platform of claim 1, wherein interchangeably, engaging with and retaining a single-motor drive unit and a multiple-motor drive unit includes utilizing each mount feature in the first and second mount features, such that each mount feature in the first and second mount features used to engage with and retain the single-motor drive unit are used to engage with and retain the multiple-motor drive unit.

3. The modular drivetrain platform of claim 1, wherein the single-motor drive unit includes a single motor with a single power output shaft to transmit power to a first drive shaft and a second drive shaft via power transmission elements contained therein.

4. The modular drivetrain platform of claim 1, wherein the multiple-motor drive unit includes two independent motors, a first motor of the two independent motors having a first power output shaft to transmit power to a first drive shaft, and a second motor of the two independent motors having a second power output shaft to transmit power to a second drive shaft, wherein the first and second motors are capable of operating independently of one another.

5. The modular drivetrain platform of claim 4, wherein the two independent motors of the multiple-motor drive unit are arranged back-to-back at a bulkhead, the two independent motors having coaxial first and second power output shafts.

6. The modular drivetrain platform of claim 5, wherein the first power output shaft is supported at one end via a first bearing disposed in the bulkhead and the second power output shaft is supported at one end via a second bearing disposed in the bulkhead, and wherein the first and second bearings are allowed to rotate about an axis of the power output shafts independently of one another.

7. The modular drivetrain platform of claim 1, further comprising:
a first drive unit mounted to the vehicle frame via the first modular drive unit mount set, the first drive unit configured to provide front-wheel drive traction power for the electric vehicle; and
a second drive unit mounted to the vehicle frame via the second modular drive unit mount set, the second drive unit configured to provide rear-wheel drive traction power for the electric vehicle;
wherein the first drive unit and the second drive unit are selected from one of the single-motor drive unit and the multiple-motor drive unit and based on a drivetrain configuration for the electric vehicle.

8. The modular drivetrain platform of claim 1, wherein a front-wheel drive drivetrain configuration includes the single-motor drive unit or the multiple-motor drive unit mounted to the at least one mount surface via the first modular drive unit mount set, a rear-wheel drive drivetrain configuration includes the single-motor drive unit or the multiple-motor drive unit mounted to the at least one mount surface via the second modular drive unit mount set, and an all-wheel drive drivetrain configuration includes the single-motor drive unit or the multiple-motor drive unit mounted to the at least one mount surface via each of the first modular drive unit mount set and the second modular drive unit mount set.

9. A vehicle frame for an electric vehicle having a front portion and a rear portion opposite the front portion, the vehicle frame comprising:
at least one mount surface extending from the front portion of the vehicle frame to the rear portion of the vehicle frame;
a front-wheel drive unit mount disposed in the at least one mount surface offset a first distance from the front portion of the vehicle frame, wherein the front-wheel drive unit mount includes first frame bolt features arranged in a frame bolt pattern that align with first motor bolt features arranged in a drive unit bolt pattern and formed in a portion of at least one motor of a front-wheel drive unit; and
a rear-wheel drive unit mount disposed in the at least one mount surface offset a second distance from the rear portion of the vehicle frame, wherein the rear-wheel drive unit mount includes second frame bolt features arranged in the frame bolt pattern that align with second bolt features arranged in the drive unit bolt pattern and formed in a portion of at least one motor of a rear-wheel drive unit;
wherein the first motor bolt features are identical to the second motor bolt features, wherein the drive unit bolt pattern is identical for both a selected type of drive unit comprising a single-motor drive unit and a multiple-motor drive unit for each of the front-wheel drive unit and the rear-wheel drive unit, wherein the portion of the at least on motor of the front-wheel drive unit mounts to the vehicle frame by bolts engaged in the first frame bolt features and corresponding aligned first motor bolt features, wherein the portion of the at least one motor of the rear-wheel drive unit mounts to the vehicle frame by bolts engaged in the second frame bolt features and corresponding aligned second motor bolt features regardless of the selected type of drive unit, and wherein, in the mounted position, at least one of the single-motor drive unit and the multiple-motor drive unit is disposed between the front portion of the vehicle frame and the rear portion of the vehicle frame.

10. The vehicle frame of claim 9, wherein the single-motor drive unit includes a single motor having a single power output shaft to transmit power to a first drive shaft and a second drive shaft via power transmission elements and a differential contained in the single-motor drive unit.

11. The vehicle frame of claim 10, wherein the multiple-motor drive unit includes two independent motors, a first motor of the two independent motors having a first power output shaft to transmit power to a first drive shaft, and a second motor of the two independent motors having a second power output shaft to transmit power to a second drive shaft, and wherein the first and second motors are capable of operating independently of one another.

12. The vehicle frame of claim 11, wherein the multiple-motor drive unit includes at least one planetary gear set and does not include a differential.

13. The vehicle frame of claim 12, wherein the two independent motors of the multiple-motor drive unit are arranged back-to-back at a bulkhead, the two independent motors having coaxial first and second power output shafts.

14. The vehicle frame of claim 13, wherein the first power output shaft is supported at one end via a first bearing disposed in the bulkhead and the second power output shaft is supported at one end via a second hearing disposed in the bulkhead, and wherein the first and second bearings are allowed to rotate about an axis of the power output shafts independently of one another.

15. The vehicle frame of claim 14, wherein the single-motor drive unit and the multiple-motor drive unit each include a drive unit bolt pattern that matches the frame bolt pattern.

16. The vehicle frame of claim 15, wherein the frame bolt pattern and the drive unit bolt pattern each include four bolt lotion features.

17. A vehicle frame for an electric vehicle having a front portion and a rear portion opposite the front portion, the vehicle frame comprising:
a front-wheel drive unit mount disposed adjacent to the front portion of the vehicle frame, wherein the front-wheel drive unit mount includes a frame bolt pattern configured to engage with a drive unit bolt pattern of a front-wheel drive unit; and
a rear-wheel drive unit mount disposed adjacent to the rear portion of the vehicle frame, wherein the rear-wheel drive unit mount includes the frame bolt pattern configured to engage with a drive unit bolt pattern of a rear-wheel drive unit;
wherein the frame bolt pattern disposed adjacent to the front portion of the vehicle frame is the same as the frame bolt pattern disposed adjacent to the rear portion of the vehicle frame, and wherein each frame bolt pattern is configured to interchangeably engage with and retain a selected single-motor drive unit and a multiple-motor drive unit by utilizing all receiving features in the frame bolt pattern regardless of the selected drive unit, wherein the single-motor drive unit and the multiple-motor drive unit each include a drive unit bolt pattern that matches the frame bolt pattern, wherein the frame bolt pattern and the drive unit bolt pattern each include four bolt location features, and wherein two of the four bolt location features are disposed on one side of a vehicle drive shaft axis and another two of the four bolt location features are symmetrically disposed on an opposite side of the vehicle drive shaft axis.

18. The vehicle frame of claim 17, wherein a set of the four bolt location features of the frame bolt pattern are disposed on one side of a vehicle centerline and another two of the four bolt location features of the frame bolt pattern are symmetrically disposed on an opposite side of the vehicle centerline.

19. The vehicle frame of claim 18, wherein the single-motor drive unit includes a single motor having a single power output shaft to transmit power to a first drive shaft and a second drive shaft via power transmission elements and a differential contained in the single-motor drive unit.

20. The vehicle frame of claim 19, wherein the multiple-motor drive unit includes two independent motors, a first motor of the two independent motors having a first power output shaft to transmit power to a first drive shaft, and a second motor of the two independent motors having a second power output shaft to transmit power to a second drive shaft, and wherein the first and second motors are capable of operating independently of one another.

* * * * *

UNITED STATES PATENT AND TRADEMARK OFFICE
CERTIFICATE OF CORRECTION

PATENT NO. : 10,703,201 B2
APPLICATION NO. : 15/841080
DATED : July 7, 2020
INVENTOR(S) : Dimitri Bassis Page 1 of 1

It is certified that error appears in the above-identified patent and that said Letters Patent is hereby corrected as shown below:

In the Claims

Claim 2, Column 27, Line 11, after "interchangeably" delete the "," therein.
Claim 9, Column 28, Line 23, after "second" insert --motor-- therein.
Claim 9, Column 28, Line 32, delete "on" and insert --one-- therein.
Claim 14, Column 28, Line 67, delete "hearing" and insert --bearing-- therein.
Claim 16, Column 29, Line 10, delete "lotion" therein.

Signed and Sealed this
Eleventh Day of August, 2020

Andrei Iancu
*Director of the United States Patent and Trademark Office*